United States Patent
Ichimasa et al.

(10) Patent No.: US 10,163,382 B2
(45) Date of Patent: Dec. 25, 2018

(54) LIQUID CRYSTAL DRIVE APPARATUS, IMAGE DISPLAY APPARATUS CAPABLE OF REDUCING DEGRADATION IN IMAGE QUALITY DUE TO DISCLINATION, AND STORAGE MEDIUM STORING LIQUID CRYSTAL DRIVE PROGRAM CAPABLE THEREOF

(71) Applicant: CANON KABUSHIKI KAISHA, Tokyo (JP)

(72) Inventors: Shoji Ichimasa, Utsunomiya (JP); Masayuki Abe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 133 days.

(21) Appl. No.: 15/253,976

(22) Filed: Sep. 1, 2016

(65) Prior Publication Data

US 2017/0069249 A1    Mar. 9, 2017

(30) Foreign Application Priority Data

Sep. 8, 2015  (JP) .................... 2015-176773
Sep. 8, 2015  (JP) .................... 2015-176886

(51) Int. Cl.
*G09G 3/00* (2006.01)
*G09G 3/20* (2006.01)
(Continued)

(52) U.S. Cl.
CPC ........... *G09G 3/2033* (2013.01); *G09G 3/002* (2013.01); *G09G 3/2003* (2013.01);
(Continued)

(58) Field of Classification Search
CPC ............... G09G 3/2003; G09G 3/2033; G09G 2340/0435; G09G 2320/0261; G09G 2320/0247; G09G 2320/0266
See application file for complete search history.

(56) References Cited

U.S. PATENT DOCUMENTS 7,535,448 B2    5/2009  Hiroki
7,982,755 B2    7/2011  Ochi et al.
(Continued)

FOREIGN PATENT DOCUMENTS

JP    2589567 B2    3/1997
JP    10096896 A    4/1998
(Continued)

OTHER PUBLICATIONS

Office Action issued in Japanese Appln. No. 2015-176773, dated Sep. 6, 2016.
(Continued)

*Primary Examiner* — Laurence J Lee
(74) *Attorney, Agent, or Firm* — Rossi, Kimms & McDowell LLP

(57) ABSTRACT

The liquid crystal drive apparatus drives a liquid crystal element. The apparatus includes an image data producer producing, using each of multiple input frame image data continuously input thereto, first frame image data and second frame image data, and a driver sequentially controlling, depending on the first frame image data and the second frame image data, application of a first voltage or a second voltage lower than the first voltage to each of multiple pixels of the liquid crystal element in respective multiple subframe periods included in one frame period to cause that pixel to form a tone. Pixel data at pixel positions corresponding to each other in the first and second frame image data have mutually different tones. A tone difference (Continued)

between the mutually different tones is 20% or less of a higher one of the mutually different tones.

16 Claims, 16 Drawing Sheets

(51) Int. Cl.
    *G09G 3/36* (2006.01)
    *G02F 1/1335* (2006.01)
    *G02F 1/1333* (2006.01)
    *G02F 1/1337* (2006.01)

(52) U.S. Cl.
    CPC .......... *G09G 3/3611* (2013.01); *G02F 1/1337* (2013.01); *G02F 1/133533* (2013.01); *G02F 1/133536* (2013.01); *G02F 2001/13355* (2013.01); *G02F 2001/133302* (2013.01); *G02F 2201/121* (2013.01); *G02F 2201/123* (2013.01); *G09G 3/36* (2013.01); *G09G 2310/0235* (2013.01); *G09G 2320/0247* (2013.01); *G09G 2320/0261* (2013.01); *G09G 2320/0266* (2013.01); *G09G 2320/0673* (2013.01); *G09G 2340/0435* (2013.01); *G09G 2360/16* (2013.01)

(56) References Cited

U.S. PATENT DOCUMENTS

| | | | |
|---|---|---|---|
| 8,063,897 | B2 | 11/2011 | Mamba et al. |
| 8,223,091 | B2 | 7/2012 | Ishihara et al. |
| 8,471,874 | B2 | 6/2013 | Sato et al. |
| 8,823,617 | B2 | 9/2014 | Kurosawa |
| 8,963,967 | B2 | 2/2015 | Yoshinaga |
| 9,013,523 | B2 | 4/2015 | Kajiyama et al. |
| 9,058,767 | B2 | 6/2015 | Toyooka |
| 9,241,092 | B2 | 1/2016 | Kitagawa et al. |
| 2002/0097207 | A1* | 7/2002 | Pfeiffer ................ G09G 3/2011 345/87 |
| 2005/0162360 | A1 | 7/2005 | Ishihara et al. |
| 2006/0038501 | A1 | 2/2006 | Koyama et al. |
| 2007/0018945 | A1 | 1/2007 | Machida et al. |
| 2008/0062162 | A1 | 3/2008 | Mamba et al. |
| 2008/0088554 | A1 | 4/2008 | Lee |
| 2008/0284700 | A1 | 11/2008 | Oke et al. |
| 2009/0058890 | A1 | 3/2009 | Kurihara |
| 2011/0164072 | A1 | 7/2011 | Kosuge |
| 2011/0248979 | A1 | 10/2011 | Nishimura |
| 2011/0249050 | A1 | 10/2011 | Ozawa et al. |
| 2012/0154555 | A1 | 6/2012 | Iwanaka et al. |
| 2012/0262501 | A1 | 10/2012 | Toyooka |
| 2013/0050286 | A1 | 2/2013 | Yoshinaga et al. |
| 2013/0050304 | A1 | 2/2013 | Yoshinaga |
| 2013/0050305 | A1 | 2/2013 | Yoshinaga |
| 2013/0135272 | A1 | 5/2013 | Park |
| 2014/0062981 | A1 | 3/2014 | Huang et al. |
| 2017/0124959 | A1 | 5/2017 | Kim et al. |

FOREIGN PATENT DOCUMENTS

| | | |
|---|---|---|
| JP | 2000163019 A | 6/2000 |
| JP | 2002236472 A | 8/2002 |
| JP | 2004309843 A | 11/2004 |
| JP | 2005173573 A | 6/2005 |
| JP | 2006171651 A | 6/2006 |
| JP | 2006201630 A | 8/2006 |
| JP | 2007316381 A | 12/2007 |
| JP | 2008009391 A | 1/2008 |
| JP | 2008033276 A | 2/2008 |
| JP | 2008065167 A | 3/2008 |
| JP | 2008176286 A | 7/2008 |
| JP | 2008268286 A | 11/2008 |
| JP | 2009020335 A | 1/2009 |
| JP | 2009162937 A | 7/2009 |
| JP | 2009294266 A | 12/2009 |
| JP | 2010250043 A | 11/2010 |
| JP | 2011221215 A | 11/2011 |
| JP | 2012103356 A | 5/2012 |
| JP | 2012128197 A | 7/2012 |
| JP | 2012203052 A | 10/2012 |
| JP | 2012226041 A | 11/2012 |
| JP | 2012242435 A | 12/2012 |
| JP | 2013050679 A | 3/2013 |
| JP | 2013050681 A | 3/2013 |
| JP | 2013050682 A | 3/2013 |
| JP | 2013195488 A | 9/2013 |

OTHER PUBLICATIONS

Office Action issued in Japanese Appln. No. 2015-176886, dated Sep. 6, 2016.
Office Action issued in Japanese Appln. No. 2015-177008, dated Sep. 13, 2016.
Office Action issued in Japanese Appln. No. 2015-176811, dated Aug. 23, 2016.
Office Action issued in Japanese Appln. No. 2015-176811 dated Jan. 5, 2017.
Office Action issued in Japanese Appln. No. 2015-177008 dated Jan. 31, 2017.
Refusal issued in Japanese Appln. No. 2015-176773 dated Jan. 31, 2017.
Refusal issued in Japanese Appln. No. 2015-176886 dated Jan. 31, 2017.
Extended European Search Report issued in European Appln No. 16001835.4 dated Feb. 2, 2017.
Office Action issued in U.S. Appl. No. 15/257,028 dated Oct. 16, 2017.
Office Action issued in U.S. Appl. No. 15/257,028 dated May 14, 2018.
Office Action issued in U.S. Appl. No. 15/254,355 dated May 18, 2018.
Office Action issued in U.S. Appl. No. 15/257,028 dated Sep. 6, 2018.
Notice of Allowance issued in U.S. Appl. No. 15/254,355 dated Oct. 24, 2018.

* cited by examiner

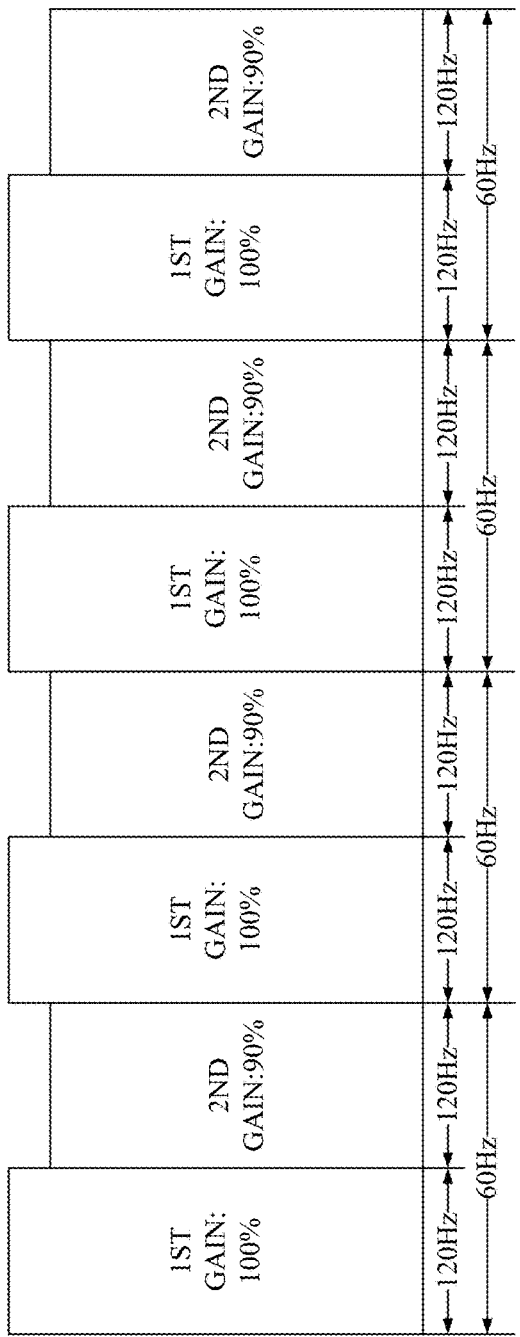
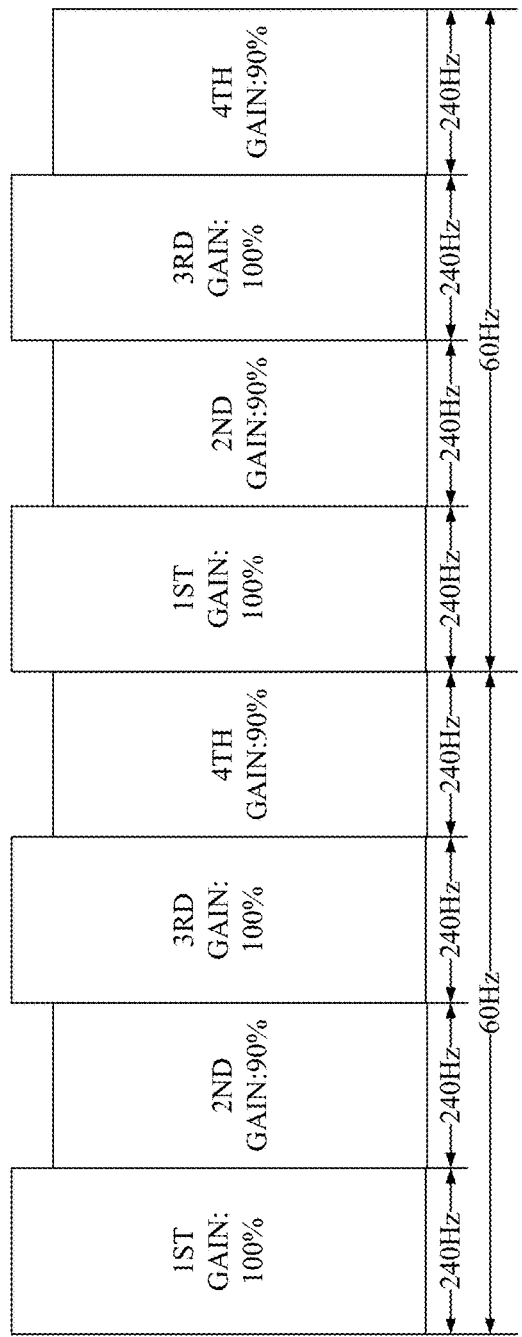
FIG. 12A
FIG. 12B

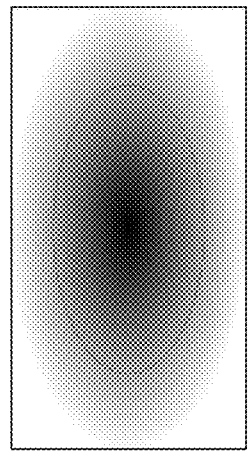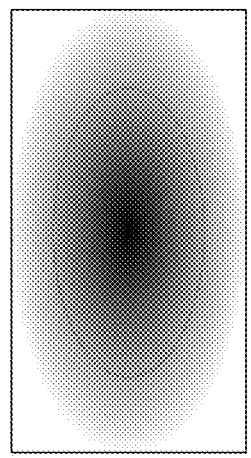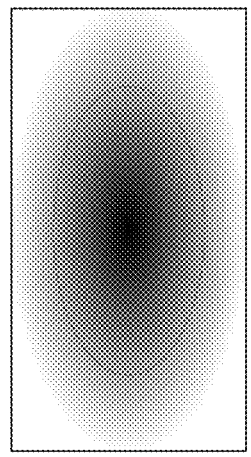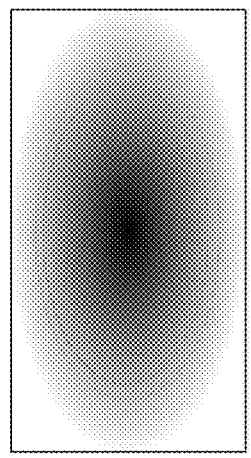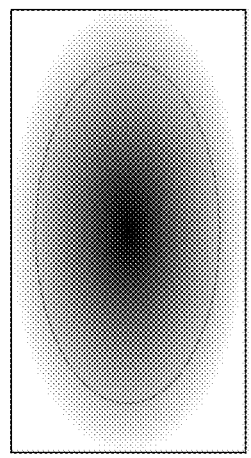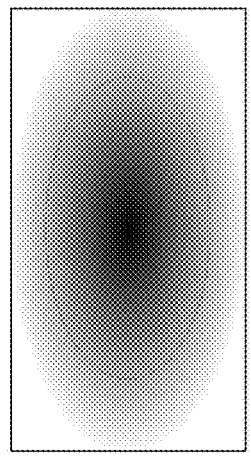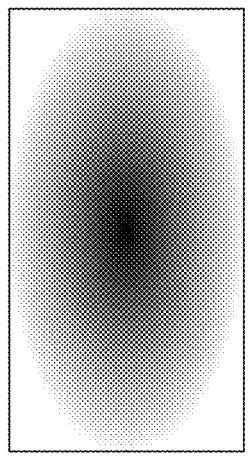
FIG. 15A
FIG. 15B
FIG. 15C

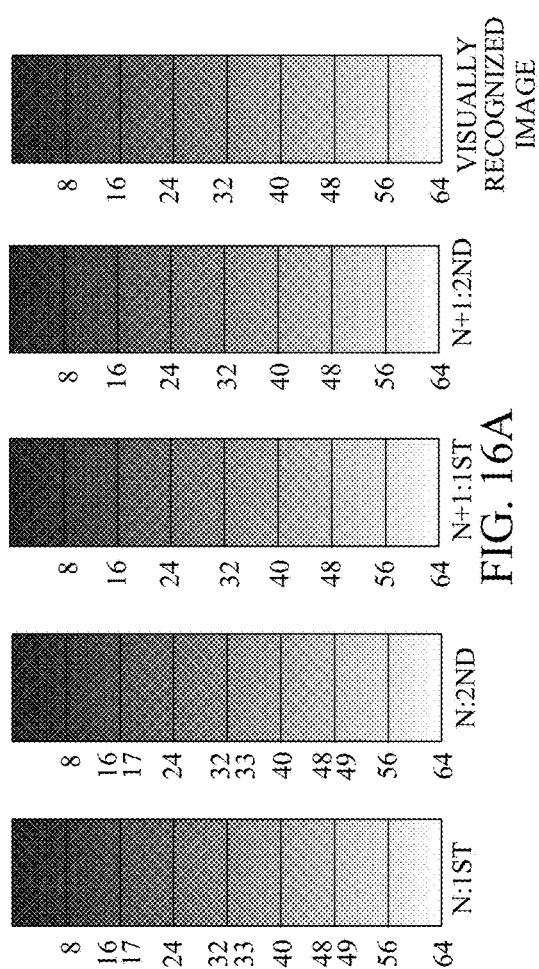
FIG. 16A
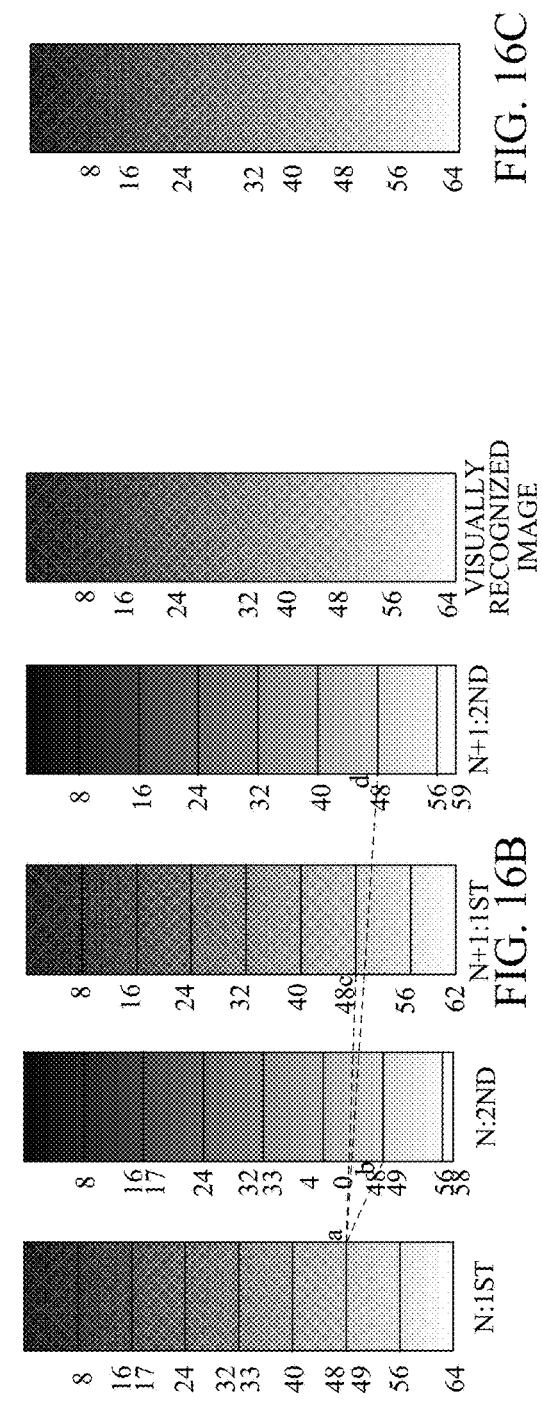
FIG. 16B
FIG. 16C

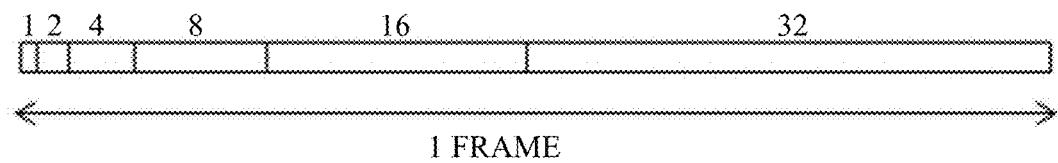
FIG. 17
(PRIOR ART)
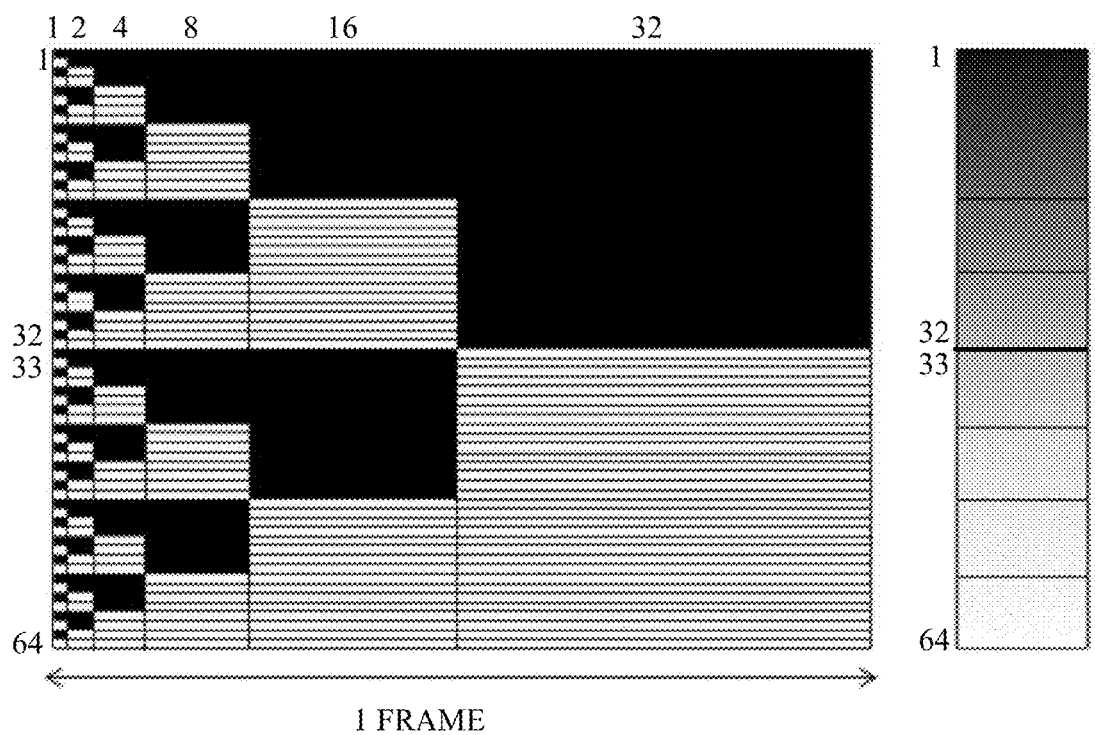
FIG. 18
(PRIOR ART)
FIG. 19
(PRIOR ART)

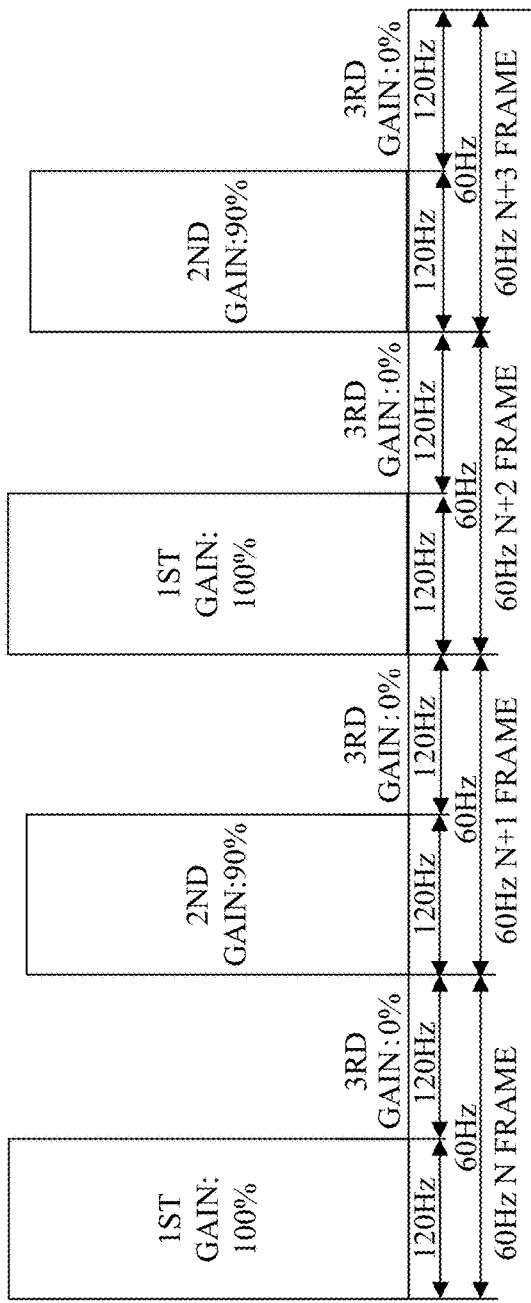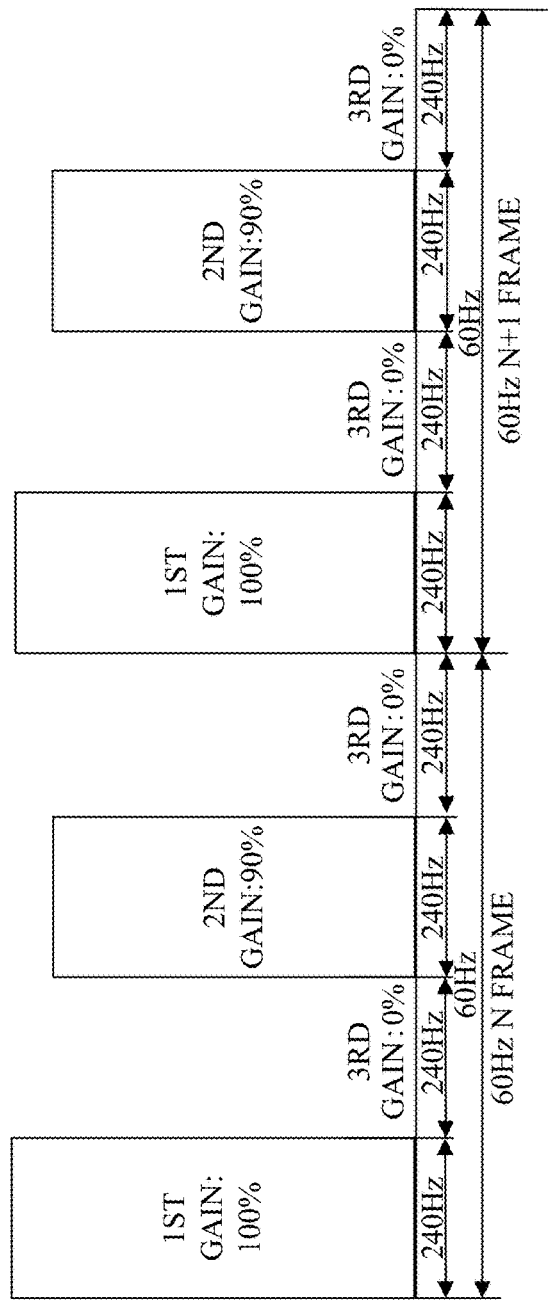
FIG. 21A
FIG. 21B

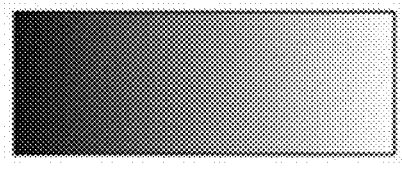
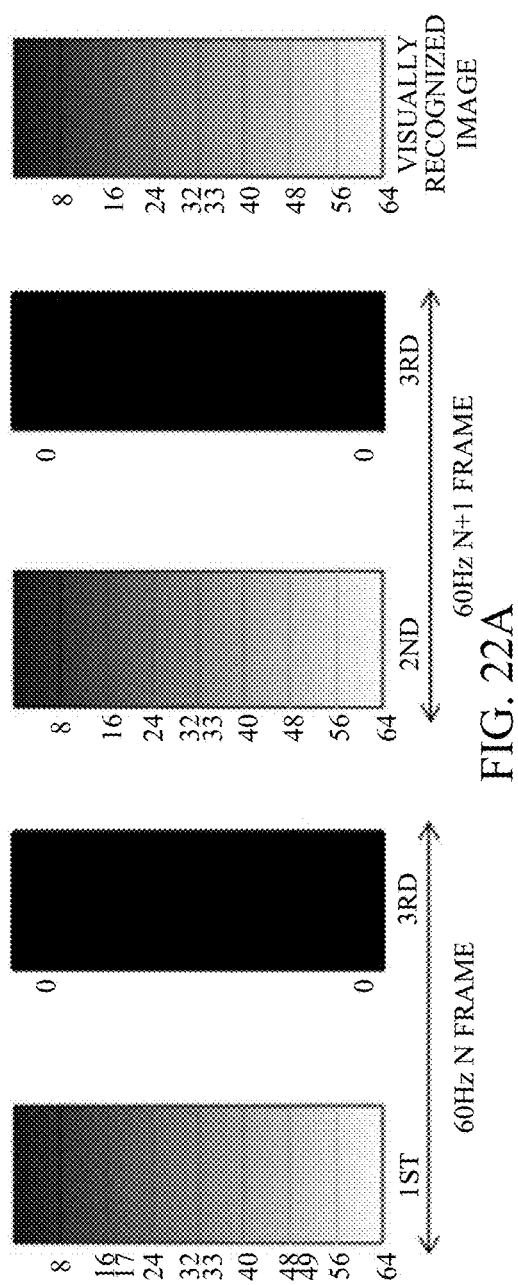
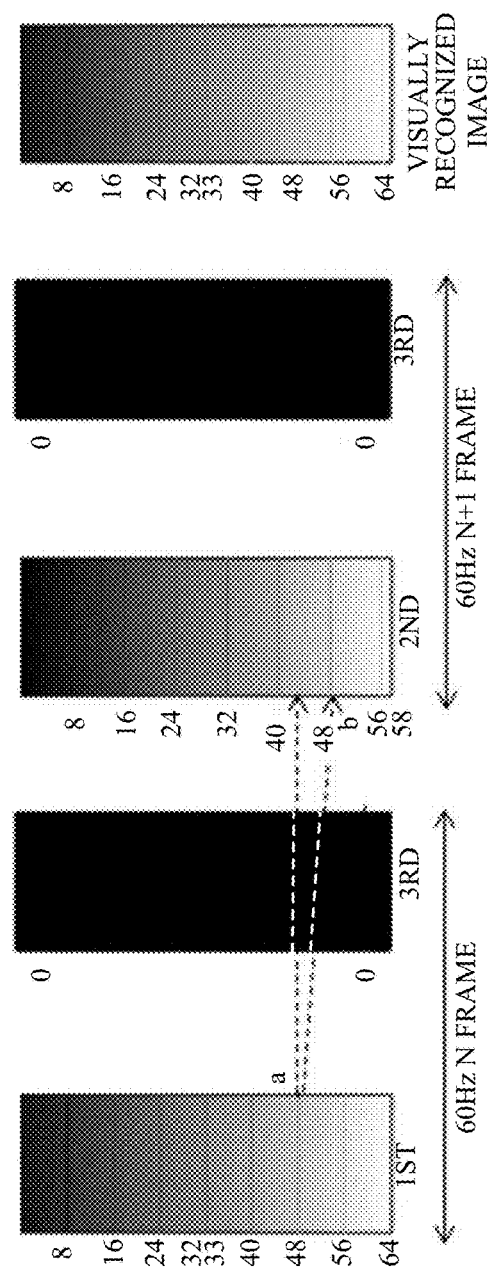
FIG. 22A
FIG. 22B
FIG. 22C

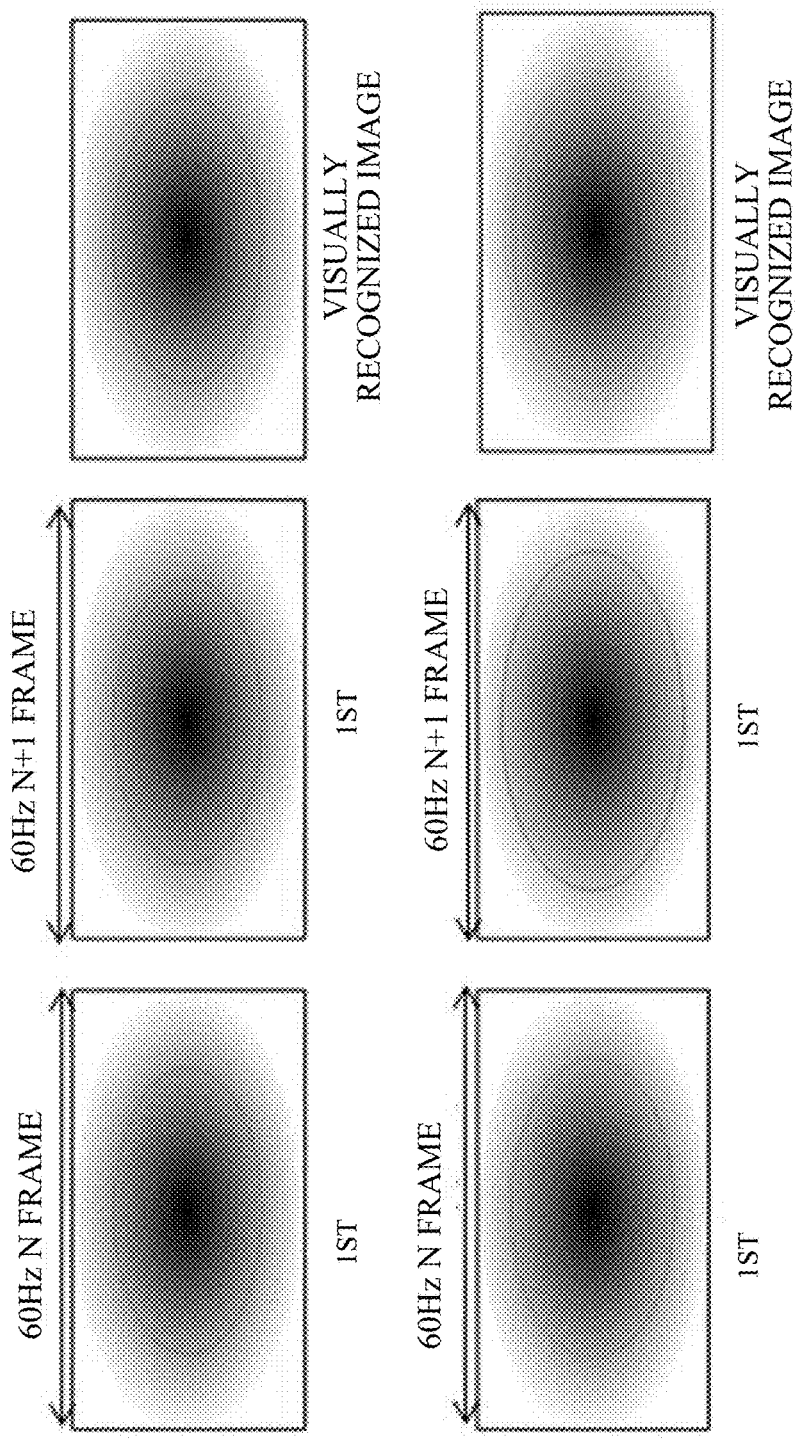

LIQUID CRYSTAL DRIVE APPARATUS, IMAGE DISPLAY APPARATUS CAPABLE OF REDUCING DEGRADATION IN IMAGE QUALITY DUE TO DISCLINATION, AND STORAGE MEDIUM STORING LIQUID CRYSTAL DRIVE PROGRAM CAPABLE THEREOF

BACKGROUND OF THE INVENTION

Field of the Invention

The present invention relates to a liquid crystal drive apparatus configured to drive a liquid crystal element by a digital driving method.

Description of the Related Art

Liquid crystal elements include transmissive liquid crystal elements such as a TN(Twisted Nematic) element and reflective liquid crystal elements such as a VAN(Vertical Alignment Nematic) element. These liquid crystal elements are driven by an analog drive method and a digital drive method. The analog drive method changes a voltage applied to a liquid crystal layer depending on tones to control lightness (brightness), and the digital drive method binarizes the voltage applied to the liquid crystal layer and changes a voltage application time period to control lightness. As such a digital drive method, a sub-frame drive method temporally divides one frame period into multiple sub-frame periods and controls application (ON) and non-application (OFF) of a predetermined voltage to each pixel to cause the pixel to display a tone.

Description will be made of a typical sub-frame drive method. FIG. 17 illustrates an example of dividing one frame period into multiple sub-frame periods (bit lengths). Numerical values written in the respective sub-frames indicate temporal weights of these sub-frames in the one frame period. The example shows a case of expressing 64 tones. In this example, a sub-frame period having a temporal weight of 1+2+4+8+16 is referred to as "an A sub-frame period", and a sub-frame period having a temporal weight of 32 is referred to as "a B sub-frame period". Furthermore, a sub-frame period where the predetermined voltage is applied is referred to as an ON period", and a sub-frame period where the predetermined voltage is not applied is referred to as an OFF period".

FIG. 18 illustrates all tone data corresponding to the division example illustrated in FIG. 17. A vertical axis indicates tones, and a horizontal axis indicates one frame period. A white sub-frame period indicates the ON period where the pixel is in a white display state, and a black sub-frame period indicates the OFF period where the pixel is in a black display state.

According to these tone data, when two pixels adjacent to each other (hereinafter referred to as "adjacent pixels") in a liquid crystal element display two tones adjacent to each other (hereinafter referred to as "adjacent tones") such as 32 and 33 tones, the 32 tone is displayed by setting the A sub-frame period to the ON period and setting the B sub-frame period to the OFF period, and the 33 tone is displayed by setting the A sub-frame period to the OFF period and setting the B sub-frame period to the ON period.

Such a state where the ON and OFF periods temporally overlap each other in the adjacent pixels, that is, the predetermined voltage is applied to one (ON-period pixel) of the adjacent pixels and the predetermined voltage is not applied to the other one (OFF-period pixel) of the adjacent pixels generates so-called disclination, which generates a decrease in lightness of the ON-period pixel. FIG. 19 illustrates an example of the decrease in lightness due to the disclination. FIG. 19 illustrates tones in its vertical direction, and its contrasting density illustrates displayed lightness. When the disclination is not generated, a smooth contrasting density can be expressed. However, when the adjacent pixels display two adjacent tones (such as the 32 and 33 tones) corresponding to a case where the ON and OFF periods overlap each other for a long time, the displayed lightness is decreased due to the disclination, which generates a dark line.

Japanese Patent Laid-Open No. 2013-050681 discloses a drive circuit that divides one or more long sub-frame periods into periods each equal to a short sub-frame period to produce multiple divided sub-frame periods. The drive circuit disclosed in Japanese Patent Laid-Open No. 2013-050681 performs, when phases of bits of tone data corresponding to adjacent pixels are mutually different, a process to maintain their tones and corrects a bit arrangement of the tone data corresponding to one of the adjacent pixels so as to make it closer to a bit arrangement of the tone data corresponding to the other one of the adjacent pixels.

This process enables, compared with a case of not dividing the long sub-frame period, shortening the sub-frame period (hereinafter referred to as "an ON/OFF adjacent period") where the ON and OFF periods mutually overlap between the adjacent pixels.

However, in the method disclosed in Japanese Patent Laid-Open No. 2013-050681, a shortest ON/OFF adjacent period of the adjacent pixels is too long to ignore the decrease in lightness due to the disclination. Furthermore, in the method, a long ON/OFF adjacent period of the adjacent pixels increases an amount of the decrease in lightness due to the disclination depending on a response speed of liquid crystal molecules.

FIG. 20 illustrates all tone data disclosed in Japanese Patent Laid-Open No. 2013-050681 where an A sub-frame corresponds to a temporal weight of 1+2+4+8 and a B sub-frame is divided into multiple divided sub-frame periods 1SF (SF means a sub-frame) to 10SF each corresponding to a temporal weight of 8. One divided sub-frame period is 0.69 ms. In the tone data, the shortest ON/OFF adjacent period of the adjacent pixels is 1.39 ms that corresponds to two divided sub-frame period. Thus, the decrease in lightness (that is, the dark line) due to the disclination is noticeable.

SUMMARY OF THE INVENTION

The present invention provides a liquid crystal drive apparatus capable of reducing degradation in image quality such as generation of a noticeable dark line due to disclination. The present invention further provides an image display apparatus using the liquid crystal drive apparatus.

The present invention provides as an aspect thereof a liquid crystal drive apparatus configured to drive a liquid crystal element. The apparatus includes an image data producer configured to produce, using each of multiple input frame image data continuously input thereto, first frame image data and second frame image data, and a driver configured to sequentially control, depending on the first frame image data and the second frame image data, application of a first voltage or a second voltage lower than the first voltage to each of multiple pixels of the liquid crystal element in respective multiple sub-frame periods included in one frame period to cause that pixel to form a tone. Pixel data at pixel positions corresponding to each other in the first and second frame image data have mutually different tones. A tone difference between the mutually different tones is 20% or less of a higher one of the mutually different tones.

The present invention provides as another aspect thereof a liquid crystal drive apparatus includes an image data producer configured to produce, using first input image data of multiple input frame image data continuously input thereto, first output frame image data and first low-tone frame image data whose tone is lower than that of the first output frame image data and produce, using second input image data of the multiple input frame image data, second output frame image data and second low-tone frame image data whose tone is lower than that of the second output frame image data, and a driver configured to sequentially control, depending on the first output frame image data, the first low-tone frame image data, the second output frame image data and the second low-tone frame image data, application of a first voltage or a second voltage lower than the first voltage to each of multiple pixels of the liquid crystal element in respective multiple sub-frame periods included in one frame period to cause that pixel to form a tone. Pixel data at pixel positions corresponding to each other in the first and second output frame image data have mutually different tones. A tone difference between the mutually different tones is 20% or less of a higher one of the mutually different tones.

The present invention provides as yet another aspect thereof an image display apparatus including a liquid crystal element, and the above liquid crystal drive apparatus.

The present invention provides as still another aspect thereof a non-transitory computer-readable storage medium storing a liquid crystal drive program as a computer program to cause a computer as the above liquid crystal drive apparatus to drive the liquid crystal element.

Further features and aspects of the present invention will become apparent from the following description of exemplary embodiments with reference to the attached drawings.

BRIEF DESCRIPTION OF THE DRAWINGS

FIGS. 12A and 12B illustrate ODD and EVEN output frame data in Embodiment 1.

FIGS. 15A to 15C illustrate other frame images sequentially displayed on the liquid crystal element in Embodiment 1.

FIGS. 16A to 16C illustrate frame images sequentially displayed on the liquid crystal element in Embodiment 2.

FIG. 17 illustrates conventional multiple sub-frame periods in one frame period.

FIG. 18 illustrates conventional all tone data.

FIG. 19 illustrates disclination generated when a liquid crystal element is driven according to the tone data illustrated in FIGS. 13A and 13B.

FIGS. 21A and 21B illustrate first and second output frame image data and entire black frame image data.

FIGS. 22A to 22C illustrate frame images sequentially displayed on a liquid crystal element in Embodiment 3 of the present invention.

FIGS. 23A to 23C illustrate other frame images sequentially displayed on the liquid crystal element in Embodiment 3.

DESCRIPTION OF THE EMBODIMENTS

Exemplary embodiments of the present invention will hereinafter be described with reference to the accompanying drawings.

[Embodiment 1]

Figure 1:
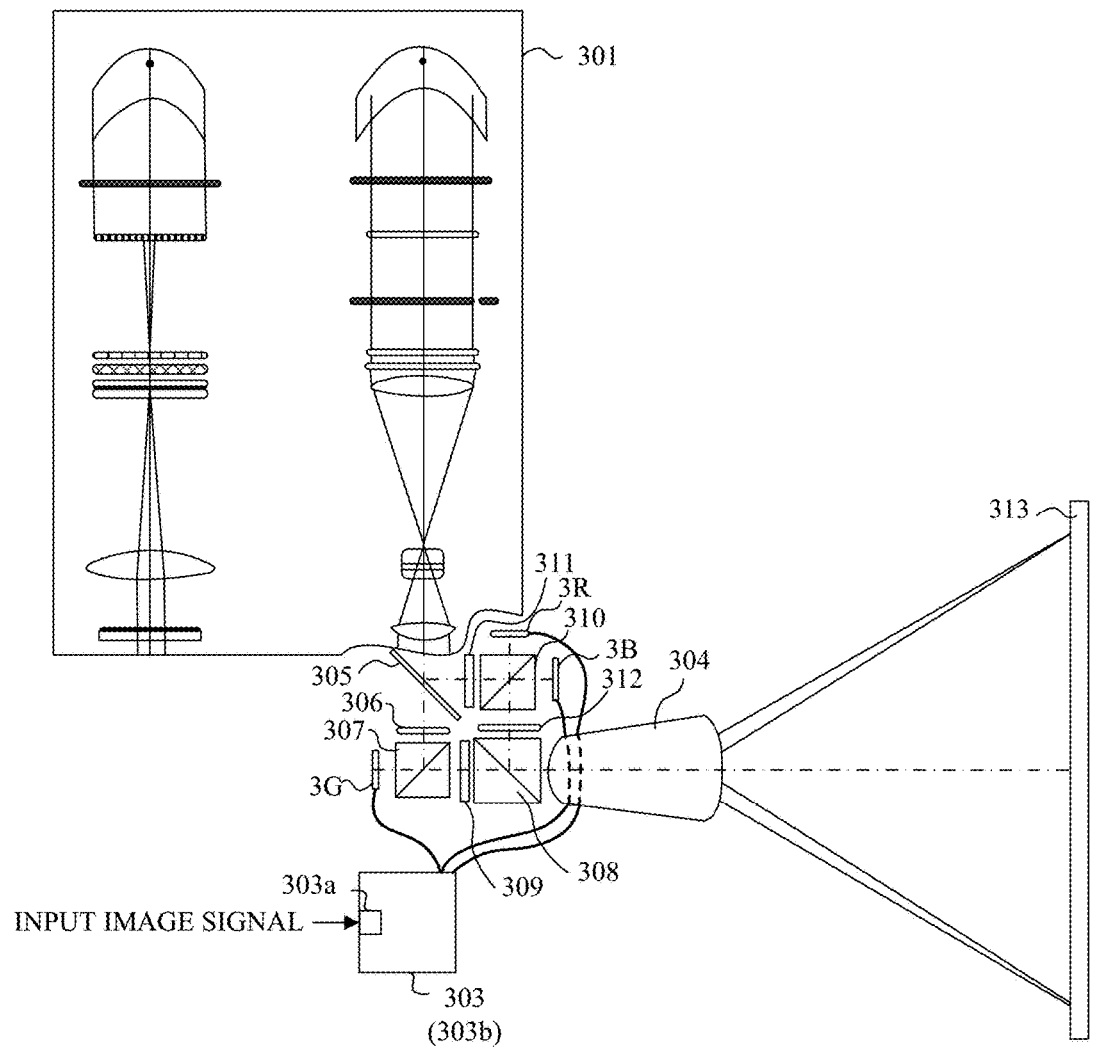
FIG. 1 illustrates an optical configuration of a liquid crystal projector that is Embodiment 1 of the present invention.

FIG. 1 illustrates an optical configuration of a liquid crystal projector as an image display apparatus that is a first embodiment (Embodiment 1) of the present invention. Although the projector is an example of image display apparatuses each using a liquid crystal element, the image display apparatuses each using the liquid crystal element include other image display apparatuses than the projector, such as a direct-view monitor.

A liquid crystal driver 303 corresponds to a liquid crystal drive apparatus. The liquid crystal driver 303 includes a video inputter (image acquirer) 303a configured to acquire an input video signal (input image) from an external device (not illustrated) and a drive circuit (driver) 303b configured to produce a pixel drive signal corresponding to tone data, which will be described later, depending on tones (input tones) of the input video signal. The pixel drive signal is produced for each of red, green and blue colors; a red pixel drive signal, a green pixel drive signal and a blue pixel drive signal are input respectively to a red liquid crystal element 3R, a green liquid crystal element 3G and a blue liquid crystal element 3B. The red, green and blue pixel drive signals enables individually driving the red liquid crystal element 3R, the green liquid crystal element 3G and the blue liquid crystal element 3B. The red liquid crystal element 3R, the green liquid crystal element 3G and the blue liquid crystal element 3B are each a reflective liquid crystal element of a vertical alignment mode.

An illumination optical system 301 converts a white light from a light source (such as a discharge lamp) into an illumination light having a fixed polarization direction and introduces the illumination light to a dichroic mirror 305. The dichroic mirror 305 reflects a magenta light and transmits a green light. The magenta light reflected by the dichroic mirror 305 enters a blue cross color polarizer 311 that provides a half wavelength retardation only to a blue color to produce the blue light and a red light whose polarization directions are orthogonal to each other. The blue light and the red light enter a polarization beam splitter 310. The blue light is transmitted through a polarization beam splitting film of the polarization beam splitter 310 to be introduced to the blue liquid crystal element 3B. The red light is reflected by the polarization beam splitting film to be introduced to the red liquid crystal element 3R.

On the other hand, the green light transmitted through the dichroic mirror 305 passes through a dummy glass 306 for correcting a green optical path length and then enters a polarization beam splitter 307. The green light is reflected by a polarization beam splitting film of the polarization beam splitter 307 to be introduced to the green liquid crystal element 3G.

Each of the liquid crystal elements 3R, 3G and 3B modulates the introduced light depending on modulation states of its pixels and reflects the modulated light. The red light modulated by the red liquid crystal element 3R is transmitted through the polarization beam splitting film of the polarization beam splitter 310 and then enters a red cross color polarizer 312 that provides a half wavelength retardation to the red color.

Thereafter, the red light enters a polarization beam splitter 308 and is reflected by a polarization beam splitting film thereof to be introduced to a projection optical system 304.

The blue light modulated by the blue liquid crystal element 3B is reflected by the polarization beam splitting film of the polarization beam splitter 310, is transmitted through the red cross color polarizer 312 without being changed, enters the polarization beam splitter 308 and then is reflected by the polarization beam splitting film thereof to be introduced to the projection optical system 304.

The green light modulated by the green liquid crystal element 3G is transmitted through the polarization beam splitting film of the polarization beam splitter 307, passes through a dummy glass 309 for correcting the green optical path length, enters the polarization beam splitter 308 and then is transmitted through the polarization beam splitting film thereof to be introduced to the projection optical system 304. The red light, the green light and the blue light thus color-combined enter the projection optical system 304. The color-combined color light is enlarged and projected by the projection optical system 304 onto a projection surface 313 such as a screen.

Although this embodiment describes the case of using reflective liquid crystal elements, transmissive liquid crystal elements may be used.

Figure 2:
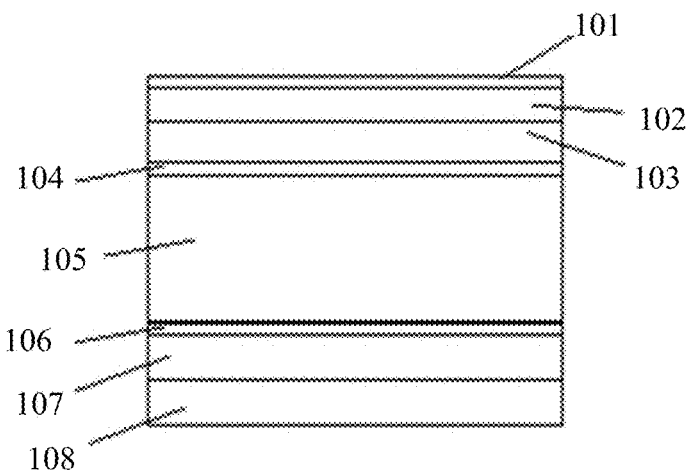
FIG. 2 is a sectional view of a liquid crystal element used in the projector of Embodiment 1.

FIG. 2 illustrates a sectional structure of the reflective liquid crystal element (3R, 3G and 3B). Reference numeral 101 denotes an anti-reflection coating film, 102 a glass substrate, 103 a common electrode, 104 an alignment film, 105 a liquid crystal layer, 106 an another alignment film, 107 a pixel electrode and 108 an Si substrate.

The liquid crystal driver 303 illustrated in FIG. 1 drives the pixels of the liquid crystal element by the above-described sub-frame drive method. That is, the liquid crystal driver 303 temporally divides one frame period into multiple sub-frame periods and controls ON (application) and OFF (non-application) of a predetermined voltage to each of the pixels depending on tone data to cause the pixel to form (display) a tone. The one frame period is a period where one frame image is displayed on the liquid crystal element. This embodiment drives the liquid crystal element at a frequency of 120 Hz and thereby sets the one frame period to 8.33 ms. The ON and OFF of the predetermined voltage can be reworded as application of a first voltage as the predetermined voltage and application of a second voltage lower than the first voltage.

Description will hereinafter be made of setting of the sub-frame period and the tone data in the liquid crystal driver 303. The liquid crystal driver 303 may be constituted by a computer and control the setting of the sub-frame period and the ON/OFF of the predetermined voltage in each sub-frame period according to a liquid crystal drive program as a computer program.

Figure 3:
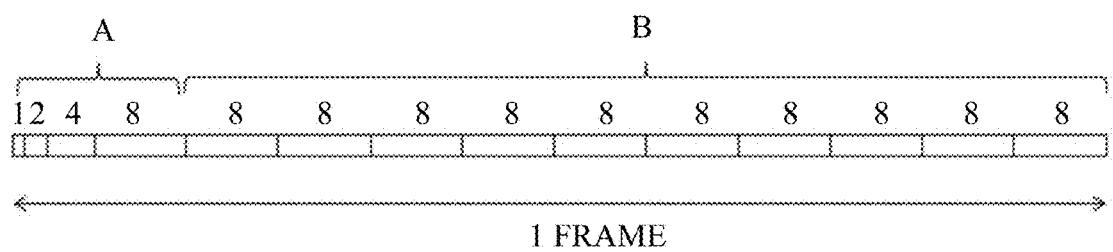
FIG. 3 illustrates multiple sub-frame periods in one frame period in Embodiment 1.

FIG. 3 illustrates the division of the one frame period into the multiple sub-frame periods (bit lengths) in this embodiment.

Numerical values written in the respective sub-frames indicate temporal weights of these sub-frames in the one frame period. This embodiment expresses 96 tones.

In this description, a period of a temporal weight of 1+2+4+8 is referred to as "an A sub-frame period" (first period), and bits indicating a tone as a binarized value in the A sub-frame period is referred to as "lower bits". Ten sub-frame periods of temporal weights of 8 are collectively referred to as "a B sub-frame period" (second period), and bits indicating a tone as a binarized value in the B sub-frame period is referred to as "higher bits". A temporal weight of 1 corresponds to 0.087 ms, and therefore the temporal weight of 8 corresponds to 0.69 ms. In addition, a sub-frame period where the above-mentioned predetermined voltage is applied (that is, a first voltage is applied) is referred to as an ON period", and a sub-frame period where the predetermined voltage is not applied (that is, a second voltage is applied) is referred to as an OFF period".

Figure 4:
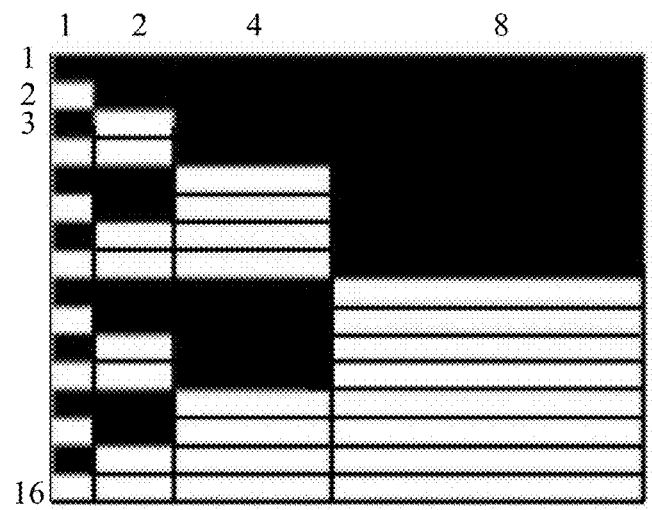
FIG. 4 illustrates tone data in an A sub-frame period in Embodiment 1.

FIG. 4 illustrates tone data in the A sub-frame period illustrated in FIG. 3. A vertical axis indicates tones, and a horizontal axis indicates one frame period. In the A sub-frame period, 16 tones are expressed. A white sub-frame period in FIG. 4 indicates the ON period where the predetermined voltage is applied to a pixel such that the pixel becomes a white display state, and a black sub-frame period indicates the OFF period where the predetermined voltage is not applied to the pixel such that the pixel becomes a black display state.

Figure 5:
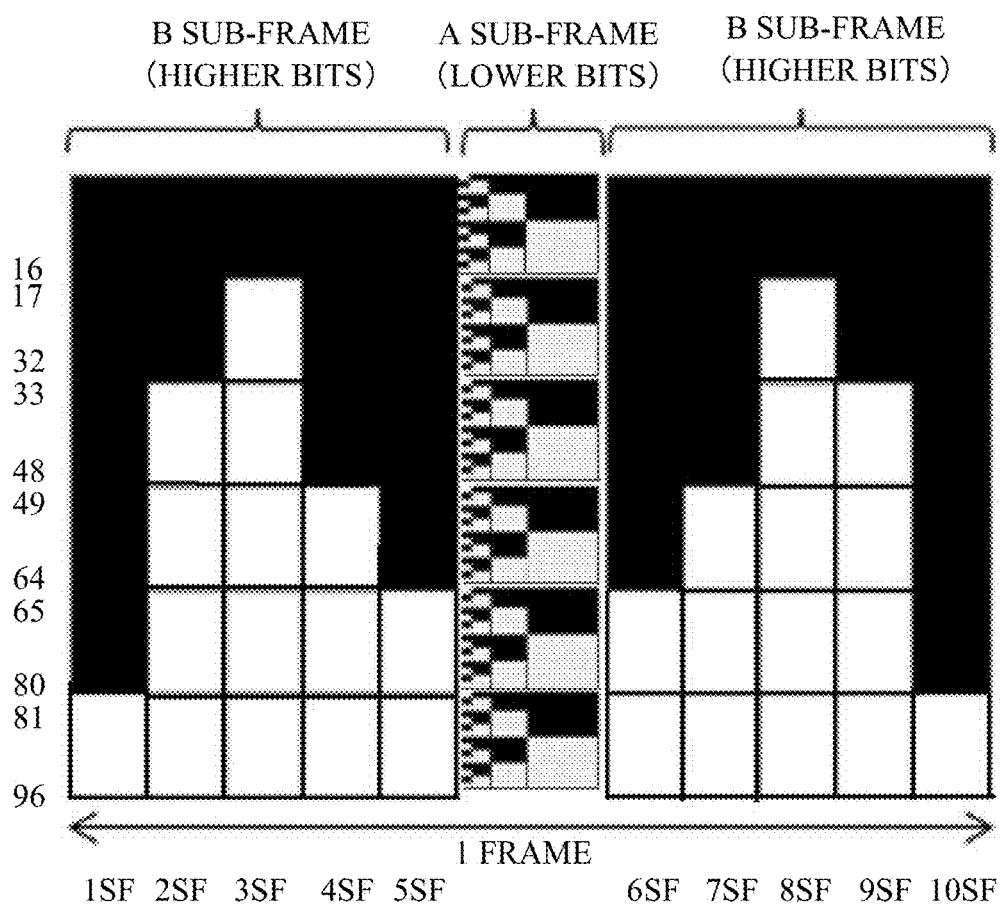
FIG. 5 illustrates all tone data in Embodiment 1.

FIG. 5 illustrates tone data (lower and higher bits) in the A and B sub-frame periods in this embodiment. These tone data are to express the entire 96 tones. In these data, the A sub-frame period (lower bits) is placed at a temporal center of the one frame period, and the B sub-frame periods (higher bits) divided into 1SF to 5SF and 6SF to 10SF are placed before and after the A sub-frame period. That is, the B sub-frame period is divided into two, and each of the divided B sub-frame periods includes two or more sub-frame periods.

According to these tone data, when adjacent pixels that are pixels adjacent to each other in the liquid crystal element display adjacent tones that are two tones adjacent to each other, for example, 48 and tones, the A sub-frame period is set to the ON period for displaying the 48 tone and to the OFF period for displaying the 49 tone. To display the 48 tone, in the B sub-frame period, 1SF, 4SF, 5SF, 6SF, 7SF and 10SF are set to the OFF period, and 2SF, 3SF, 8SF and 9SF are set to the ON period. To display the 49 tone, in the B sub-frame period, 1SF, 5SF, 6SF, and 10SF are set to the OFF period, and 2SF, 3SF, 4SF, 7SF, 8SF and 9SF are set to the ON period. When the adjacent pixels display such adjacent tones, an ON/OFF adjacent period where the ON and OFF periods overlap between the adjacent pixels is generated. Specifically, when the adjacent pixels display the 48 and 49 tones, 4SF and 7SF in the B sub-frame period are each the ON/OFF adjacent period.

Figure 20:
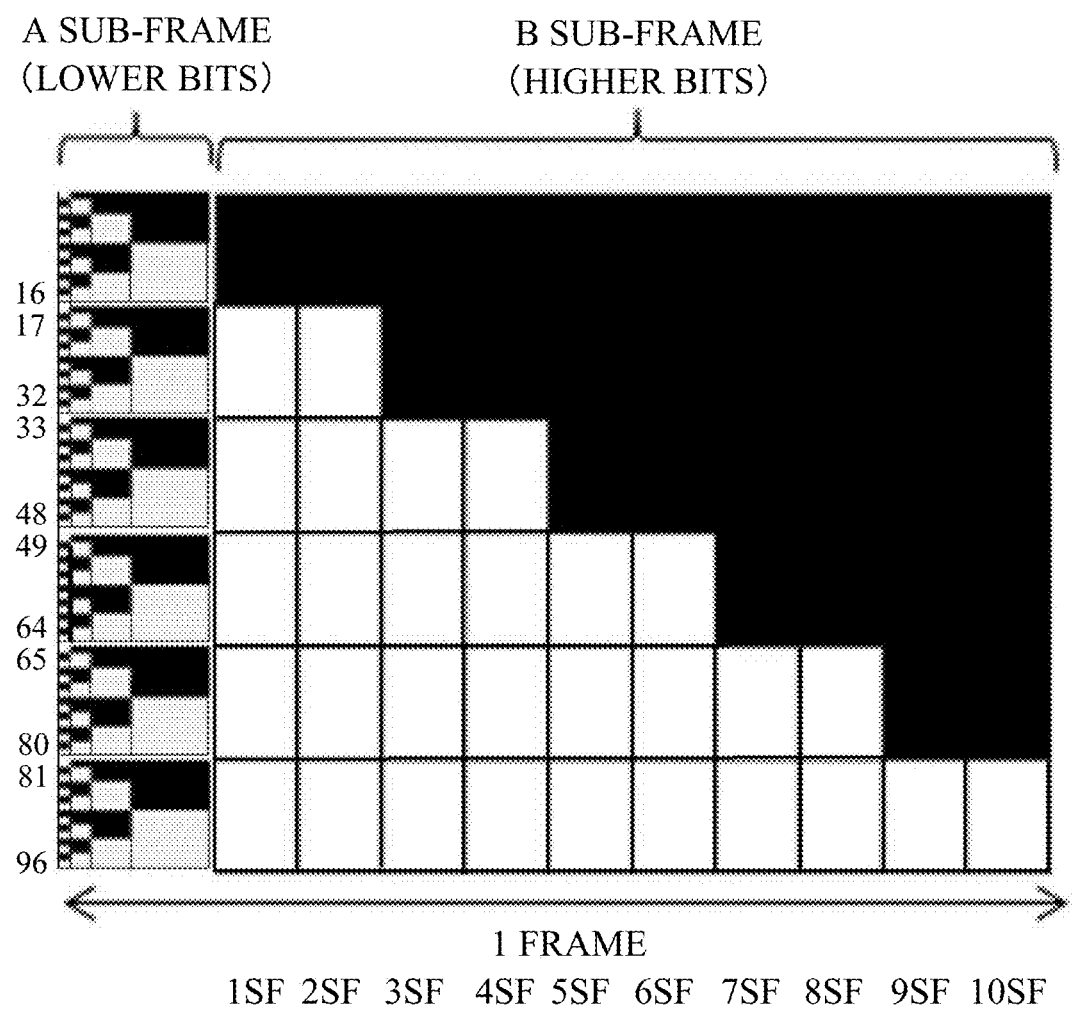
FIG. 20 illustrates all tone data disclosed in Japanese Patent Laid-Open No. 2013-050681.

Comparison of the tone data in this embodiment with the conventional tone data illustrated in FIG. 20 (Japanese Patent Laid-Open No. 2013-050681) will here be made. In the tone data illustrated in FIG. 20, the B sub-frame period as a single period continues after the A sub-frame period. However, in the tone data in this embodiment illustrated in FIG. 5, the B sub-frame periods as divided periods are placed before and after the A sub-frame period. In FIG. 20, when, for example, the 48 and 49 tones are displayed, 5SF and 6SF in the B sub-frame period are the ON/OFF adjacent periods. That is, a single ON/OFF adjacent period from 5SF to 6SF continues for a period corresponding to a temporal weight of 16. This also applies to other adjacent tones such as 16 and 17 tones, 32 and 33 tones, 64 and 65 tones and 80 and 81 tones.

On the other hand, in this embodiment of FIG. 5, at any of the above-mentioned adjacent tones, a single ON/OFF adjacent period continues in the B sub-frame period only for one sub-frame period whose temporal weight 8 (corresponding to 0.69 ms). A plurality of (two) such ON/OFF adjacent periods each being one sub-frame period are disposed separately from each other across the A sub-frame period.

Next, description will be made of effects provided by disposing the ON/OFF adjacent periods separately.

Figure 6:
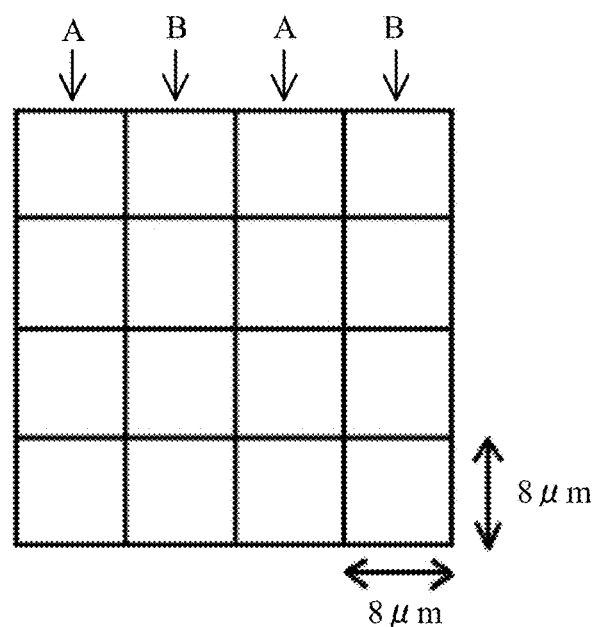
FIG. 6 illustrates pixel lines in Embodiment 1.

First, description will be made of a liquid crystal characteristic of the liquid crystal element when its pixels arranged in a matrix form as illustrated in FIG. 6 are switched from an entire white display state to a white and black display state where white and black are alternately displayed one pixel line by one pixel line and another liquid crystal characteristic when the pixels are switched from an entire black display state to the white and black display state. In FIG. 6, 4×4 pixels are arranged in the matrix form with a pixel pitch of 8 μm. In the entire white display state, both pixels included in A pixel lines and B pixel lines display white as illustrated in FIG. 6. In the white and black display state, the pixels of the A pixel lines are switched from the white display state to the black display state, and on the other hand the pixels of the B pixel lines are maintained in the white display state.

Figure 7:
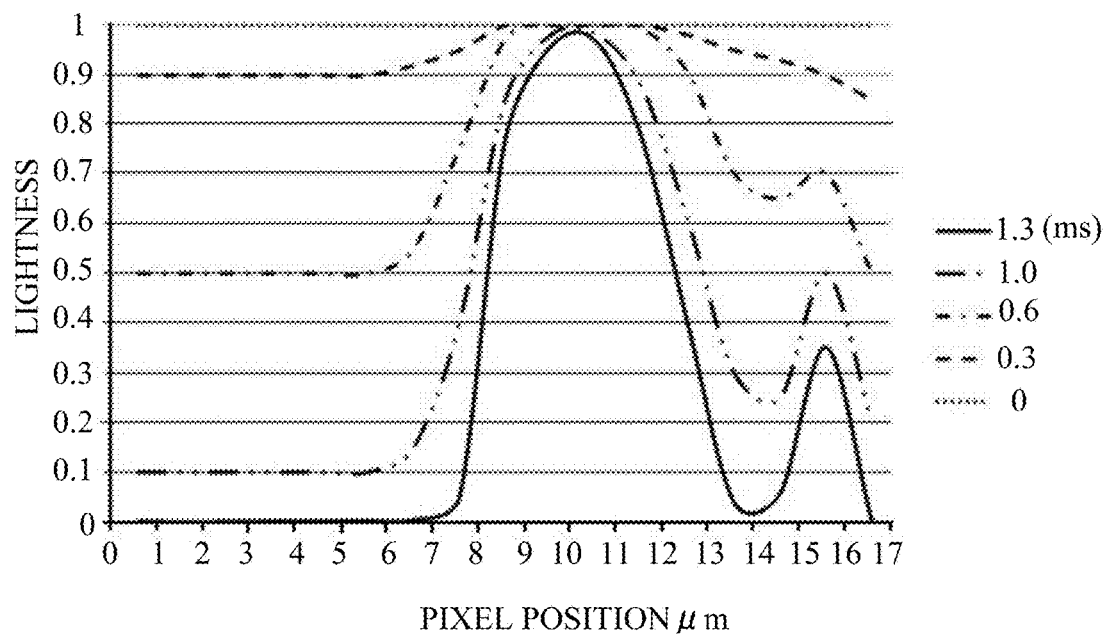
FIG. 7 illustrates a liquid crystal response characteristic when a switching is made from an entire white display state to a white and black display state in Embodiment 1.

FIG. 7 illustrates the liquid crystal characteristics. A horizontal axis indicates pixel positions, and a vertical axis indicates lightness (as a ratio when a lightness of white is 1) of each pixel.

A pixel position range from 0 to 8 μm on the horizontal line corresponds to the pixel of the A pixel line illustrated in FIG. 6, and a pixel position range from 8 μm to 16 μm thereon corresponds to the pixel of the B pixel line. Multiple curves indicate lightnesses at elapsed times (0.3 ms, 0.6 ms, 1.0 ms and 1.3 ms) when the display state of the pixels is switched from the entire white display state to the white and black display state at 0 ms.

As described above, when the pixels of each A pixel line are switched from the white display state to the black display state, the lightness of the pixels of each A pixel line are approximately evenly changed (darkened) without being affected by the above-described disclination because of a relation with a direction of a pre-tilt angle of liquid crystal molecules. On the other hand, in the pixels of each B pixel line, the disclination is not generated in the entire white display state. However, after the switching to the white and black display state, the lightness curve gradually deforms to a distorted shape with time due to the disclination, and especially in a pixel position range around 12 μm to 16 μm, the lightness darkens (a dark line is generated).

In general, a gamma curve (gamma characteristic) for setting drive tones of the liquid crystal element with respect to input tones is produced depending on a response characteristic of the liquid crystal element obtained by changing a displayed tone while causing the liquid crystal element to display an identical display tone on its whole surface with no disclination. Therefore, driving the liquid crystal element using such a gamma curve generates the disclination in the white and black display state, which only provides a lower lightness than the original lightness corresponding to the gamma curve.

Figure 8:
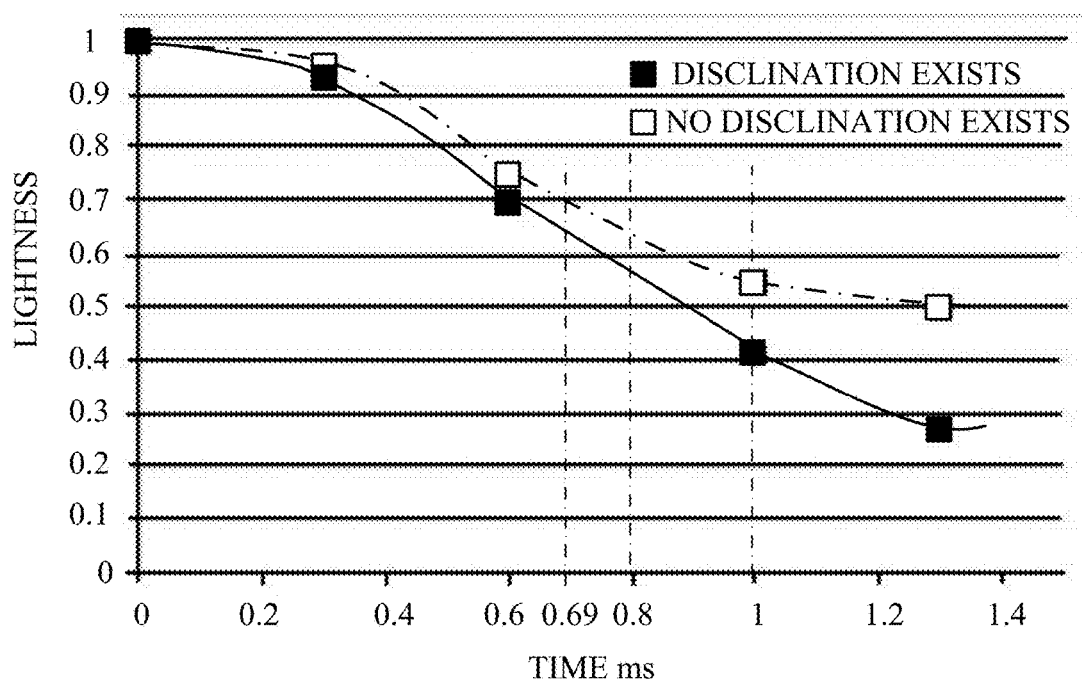
FIG. 8 illustrates a lightness response characteristic when the switching is made from the entire white display state to the white and black display state in Embodiment 1.
Figure 9:
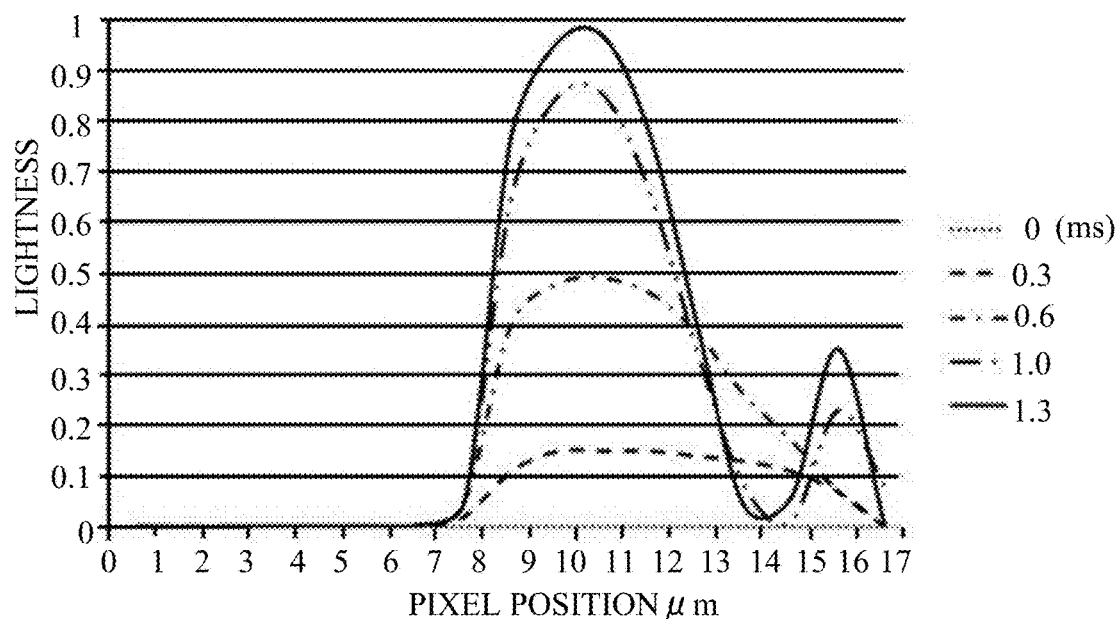
FIG. 9 illustrates a liquid crystal response characteristic when a switching is made from an entire black display state to the white and black display state in Embodiment 1.

FIG. 8 illustrates changes of the lightness when the switching of the liquid crystal element from the entire white display state to the white and black display state generates the disclination and when the switching does not generate the disclination. A horizontal axis indicates elapsed times from the switching of the display state, and a vertical line indicates the lightness as an integrated value of a total lightness of the A and B pixel lines. The lightness is indicated by a ratio when a lightness in the entire white display state is 1. When the disclination is generated (that is, "disclination exists"), the lightness of the pixels of the A pixel line changes with a characteristic close to the liquid crystal response characteristic illustrated in a pixel position range around 1 μm to 6 μm in FIG. 7, and the lightness of the pixels of the B pixel line corresponds to white with 100% lightness. Then, as time proceeds, an amount of a decrease in lightness when the disclination exists increases further than that when the disclination is not generated (that is, "no disclination exists"). On the other hand, when the liquid crystal element is switched from the entire black display state to the white and black display state, from a state where the pixels of both the A and B pixel lines illustrated in FIG. 6 are in the black display state, the pixels of the B pixel lines are switched to the white display state while the pixels of the A pixel lines are maintained in the black display state. FIG. 9 illustrates the liquid crystal response characteristic when this switching is made. A horizontal axis indicates pixel positions, and a vertical axis indicates lightness (as a ratio when the lightness of white is 1). A pixel position range from to 8 μm on the horizontal line corresponds to the pixel of the A pixel line illustrated in FIG. 6, and a pixel position range from 8 pm to 16 μm thereon corresponds to the pixel of the B pixel line. Multiple curves indicate lightnesses at elapsed times (0.3 ms, 0.6 ms, 1.0 ms and 1.3 ms) when the display state of the pixels is switched from the entire black display state to the white and black display state at 0 ms.

In the pixels of the B pixel line switched from the black display state to the white display state, after the switching to the white display state, the lightness curve gradually deforms to a distorted shape with time due to the disclination, and especially in a pixel position range around 12 μm to 16 μm, the lightness darkens (a dark line is generated). Furthermore, the distorted shape of the lightness curved line becomes significant with time.

As described above, the gamma curve (gamma characteristic) for setting the drive tones of the liquid crystal element with respect to the input tones is produced depending on the liquid crystal response characteristic obtained by changing the displayed tone while causing the liquid crystal element to display an identical display tone on its whole surface with no disclination. Therefore, driving the liquid crystal element using such a gamma curve generates the disclination in the white and black display state, which only provides a lower lightness than the original lightness corresponding to the gamma curve.

Figure 10:
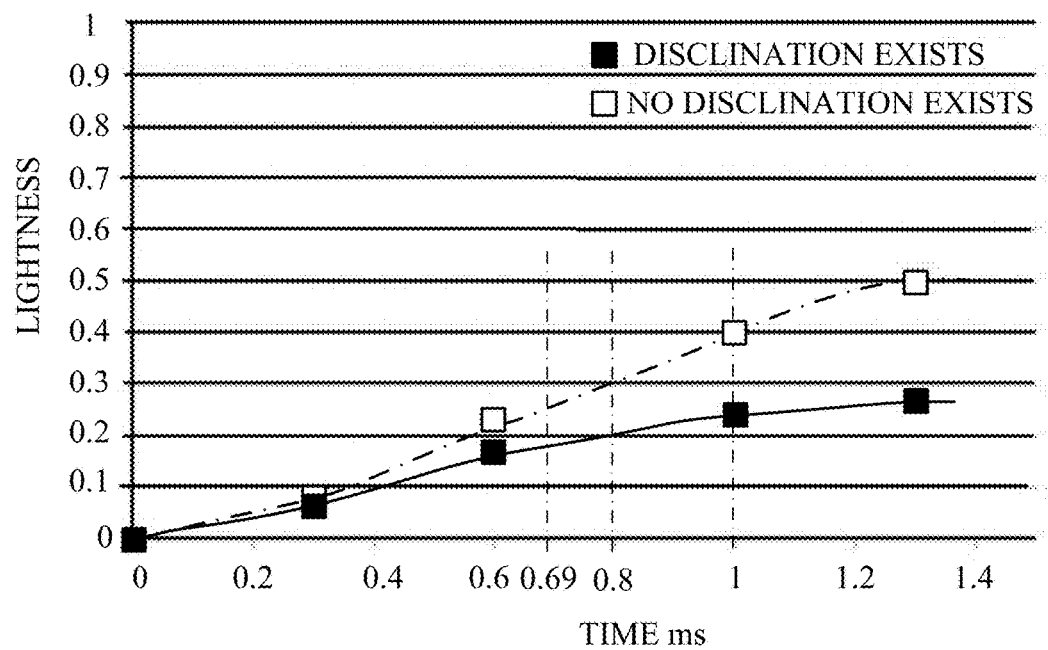
FIG. 10 illustrates a lightness response characteristic when the switching is made from the entire black display state to the white and black display state in Embodiment 1.

FIG. 10 illustrates changes of the lightness when the switching of the liquid crystal element from the entire black display state to the white and black display state generates the disclination and when the switching does not generate the disclination. A horizontal axis indicates elapsed times from the switching of the display state, and a vertical line indicates the lightness as an integrated value of a total lightness of the A and B pixel lines. The lightness is indicated by a ratio when the lightness in the entire white display state is 1. As the lightness that changes when the disclination is not generated ("no disclination exits"), a lightness when the pixels of the B lines are changed from the black display state to the white display state while the pixels of the A pixel line are maintained in the black display state is illustrated. On the other hand, as the lightness that changes when the disclination is generated ("disclination exits"), the integrated value of a sum of lightnesses of the pixels of the A and B pixel lines illustrated in FIG. 9 is illustrated.

In FIG. 10, when the disclination is generated, an amount of an increase in lightness is smaller than that when the disclination is not generated.

That is, a longer time period where the disclination is generated after the display state is switched from the entire black display state to the white and black display state makes the lightness darker than that when the disclination is not generated.

Next, description will be made of a case of causing the pixels of the A pixel line to display the 48 tone and causing the pixels of the B pixel line to display the 49 tone according to the conventional tone data illustrated in FIG. 20. When these tone data are used, the disclination is generated in 5SF and 6SF in the B sub-frame period where a disclination generation state is established in which the pixels of the A pixel line are in the black display state and the pixels of the B pixel line are in the white display state.

On the other hand, 4SF before 5SF, where the pixels of both the A and B pixel lines are in the white display state, is a period where the disclination is not generated.

A liquid crystal response characteristic in 5SF and 6SF corresponds to that when the "disclination exists" in FIG. 8. The lightness in 4SF where the display state is the entire white display state is at 100% and then the disclination is generated during 1.39 ms from a start of 5SF to an end of 6SF, so that the start of 5SF corresponds to 0 ms in FIG. 8, and the end of 6SF corresponds to 1.39 ms. During the 1.39 ms, the lightness decreases to 0.27 with respect to 0.5 when "no disclination exists". When the gamma characteristic produced on condition that the liquid crystal element displays the identical display tone on its whole surface as described above is used as a base, the generation of the disclination from 5SF to 6SF darkens the lightness to 54% (=0.27/0.5) in ratio.

Next, in this embodiment, a case of causing the pixels (second pixels) of the A pixel line to display the 48 tone and causing the pixels (first pixels) of the B pixel line to display the 49 tone according to the tone data illustrated in FIG. 5 will be described.

When these tone data are used, the disclination is generated in 4SF and 7SF in the B sub-frame period where the pixels of the A and B pixel lines are in the above-mentioned disclination generation state. On the other hand, 3SF before 4SF, where the pixels of both the A and B pixel lines are in the white display state, is a period where the disclination is not generated.

A liquid crystal response characteristic in 4SF corresponds to that when the "disclination exists" in FIG. 8. The lightness in 3SF where the display state is the entire white display state is at 100% and the disclination is generated during 0.69 ms in 4SF, so that a start of 4SF corresponds to 0 ms in FIG. 8, and an end of 4SF corresponds to 0.69 ms. During the 0.69 ms, the lightness only decreases to 0.65 with respect to 0.7 when "no disclination exists".

A liquid crystal response characteristic in 7SF that is the other sub-frame period where the disclination is generated corresponds to that when the "disclination exists" in FIG. 10.

The lightness in 6SF where the display state is the entire black display state is at 0% and then the disclination is generated during 0.69 ms in 7SF, so that a start of 7SF corresponds to 0 ms in FIG. 10, and an end of 7SF corresponds to 0.69 ms. During the 0.69 ms, the lightness only decreases to 0.18 with respect to 0.25 when "no disclination exists".

A sum of the lightnesses in 4SF and 7SF when the disclination is not generated is 0.95 (=0.70+0.25), and on the other hand, a sum of the lightnesses in 4SF and 7SF when the disclination is generated is 0.83 (=0.65+0.18). When the gamma characteristic produced on condition that the liquid crystal element displays the identical display tone on its whole surface is used as the base, the generation of the disclination in this case only darkens the lightness to 87% (=0.83/0.95) in ratio. That is, this embodiment enables reducing the decrease in lightness.

Next, description will be made of a case where other adjacent tones are displayed. First, description will be made of a case of causing the pixels of the A pixel line illustrated in FIG. 6 to display 16 tone and causing the pixels of the B pixel line to display 17 tone according to the conventional tone data illustrated in FIG. 20. When these tone data are used, the disclination is generated in 1SF and 2SF in the B sub-frame period where a disclination generation state is established in which the pixels of the A pixel line are in the black display state and the pixels of the B pixel line are in the white display state.

The liquid crystal response characteristic in 1SF to 2SF corresponds to that when the "disclination exists" in FIG. 10. The disclination is generated during 1.39 ms from a start of 1SF to an end of 2SF, so that the start of 1SF corresponds to 0 ms in FIG. 10, and the end of 2SF corresponds to 1.39 ms. During the 1.39 ms, the lightness decreases to 0.27 with respect to 0.5 when "no disclination exists". When the gamma characteristic produced on condition that the liquid crystal element displays the identical display tone on its whole surface as described above is used as the base, the generation of the disclination from 1SF to 2SF darkens the lightness to 54% (=0.27/0.5) in ratio.

Next, in this embodiment, a case of causing the pixels (second pixels) of the A pixel line to display the 16 tone and causing the pixels (first pixels) of the B pixel line to display the 17 tone according to the tone data illustrated in FIG. 5 will be described.

When these tone data are used, the disclination is generated in 3SF and 8SF in the B sub-frame period where the pixels of the A and B pixel lines are in the above-mentioned disclination generation state. On the other hand, 2SF before 3SF, where the pixels of both the A and B pixel lines are in the black display state, is a period where the disclination is not generated. A liquid crystal response characteristic in 3SF corresponds to that when the "disclination exists" in FIG. 10. The lightness in 2SF where the display state is the entire black display state is at 0% and then the disclination is generated during 0.69 ms in 3SF, so that a start of 7SF corresponds to 0 ms in FIG. 10, and an end of 3SF corresponds to 0.69 ms. During the 0.69 ms, the lightness only decreases to 0.18 with respect to 0.25 when "no disclination exists".

A liquid crystal response characteristic in 8SF that is the other sub-frame period where the disclination is generated also corresponds to that when the "disclination exists" in FIG. 10. The lightness in 7SF where the display state is the entire black display state is at 0% and then the disclination is generated during 0.69 ms in 8SF, so that a start of 8SF corresponds to 0 ms in FIG. 10, and an end of 8SF corresponds to 0.69 ms. During the 0.69 ms, the lightness only decreases to 0.18 with respect to 0.25 when "no disclination exists".

A sum of the lightnesses in 3SF and 8SF when the disclination is not generated is 0.50 (=0.25+0.25), and on the other hand, a sum of the lightnesses in 3SF and 8SF when the disclination is generated is 0.36 (=0.18+0.18). When the gamma characteristic produced on condition that the liquid crystal element displays the identical display tone on its whole surface is used as the base, the generation of the disclination in this case only darkens the lightness to 72% (=0.36/0.50) in ratio. That is, this embodiment enables reducing the decrease in lightness.

As described above, this embodiment provides the multiple ON/OFF adjacent periods, where the display of the adjacent tones at the adjacent pixels causes the disclination generation state, mutually separately (dispersedly) in the one frame period, which shortens one contiguous ON/OFF adjacent period. Namely, this embodiment causes, before the amount of the decrease in lightness due to the disclination increases, the disclination generation state to change to the other display state. This embodiment thereby enables reducing the decrease in lightness due to the disclination to make the dark line unnoticeable, which enables displaying a good quality image.

The above-described drive method (hereinafter referred to as "a first drive method") enables reducing the generation of the disclination. However, in order to make the dark line due to the disclination more unnoticeable, this embodiment also uses the following drive method (hereinafter referred to as "a second drive method").

Figure 11:
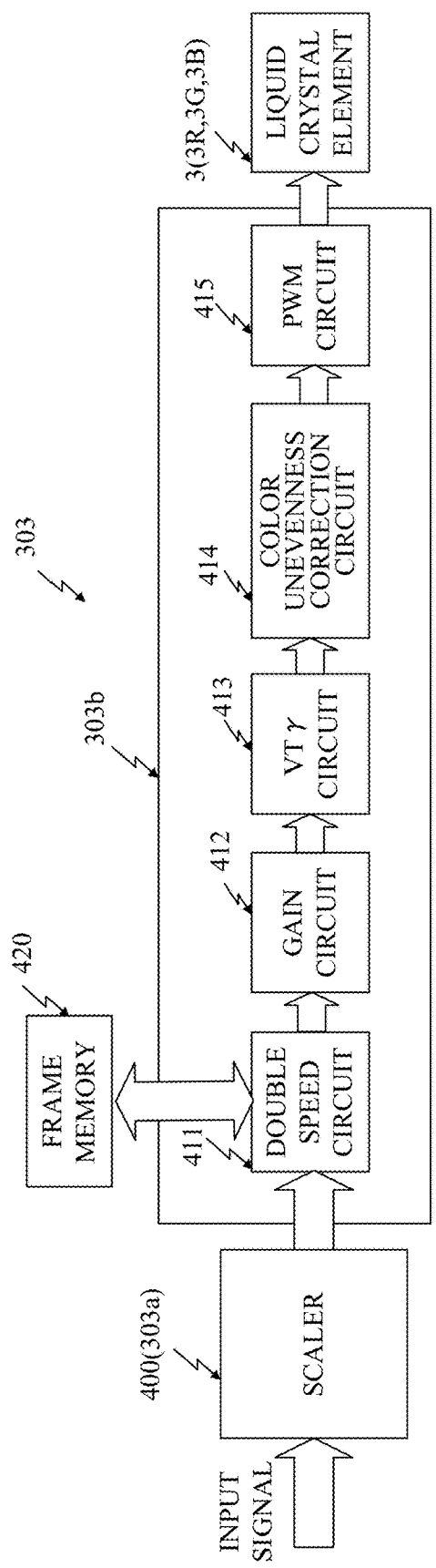
FIG. 11 illustrates a configuration of a liquid crystal driver in Embodiment 1.

FIG. 11 illustrates an internal configuration of the liquid crystal driver 303 illustrated in FIG. 1. A scaler 400 corresponds to the video inputter 303*a* configured to take in the input video signal through a DVI or HDMI® receiver IC (not illustrated).

The scaler 400 is further configured to down-convert or up-convert the input video signal by its scaling function to output input image data in a predetermined image format. The input image data are constituted by multiple input frame image data continuously input to the scaler 400.

A drive circuit 303*b* is configured to sequentially receive the input frame image data from the scaler 400 to produce a pixel drive signal for driving each pixel of a liquid crystal element 3 (corresponding to the three liquid crystal elements 3R, 3G and 3B illustrated in FIG. 1), that is, for causing each pixel to display (form) a tone. The drive circuit 303*b* includes a double speed circuit 411, a gain circuit 412, a VTγ circuit 413, a color unevenness correction circuit 414 and a PWM circuit 415.

The double speed circuit 411 is configured to write the respective input frame image data to a frame memory 420 and to produce multiple frame image data using each of the written input frame image data. In this embodiment, the double speed circuit 411 produces, when an input frequency is 60 Hz, two frame image data at a frequency corresponding to 120 Hz. In the following description, one of the two frame image data is referred to as "ODD input frame data", and another thereof is referred to as "EVEN input frame data". These ODD and EVEN input frame data are the same image data as the input frame image data. In other words, pixel data at pixel positions corresponding to each other (in other words, corresponding pixel positions) in the ODD and EVEN input frame data have mutually identical tones.

The gain circuit 412 is configured to apply a gain to the ODD and EVEN input frame data from the double speed circuit 411 (that is, multiply the ODD and EVEN input frame data by a gain coefficient) to produce ODD output frame data as first frame image data and EVEN output frame data as second frame image data.

The gain circuit 412 can apply mutually different gains to the ODD and EVEN input frame data. The double speed circuit 411 and the gain circuit 412 constitute an image data producer. Applying 0 (third gain) as the gain to one of the ODD and EVEN input frame data enables producing entire black frame image data for causing the all pixels of the liquid crystal element 3 to display black (that is, causing all the pixels to form black tones as mutually identical tones). This entire black display enables so-called "black insertion" to improve visibility (reduce visual persistence) of a displayed motion image. However, the black insertion may cause flicker that is noticeable periodic light and dark changes at a frame frequency. Therefore, this embodiment sets the third gain applied to the ODD and EVEN input frame data not to 0 but to a low gain that is 50% or less of a higher one of later-described first and second gains.

Using such a third gain enables, while reducing the flicker, improving the visibility of the displayed motion image. Such a drive method that applies the low gain, which is not 0, to one of the ODD and EVEN input frame data to cause the liquid crystal element 3 to alternately display a light frame image and a dark frame image is referred to as "a light-and-dark drive method".

In the following description, one of the ODD and EVEN output frame data, which is obtained by applying the third gain (0 or the low gain) to the ODD or EVEN input frame data, is referred to as "low-tone frame image data". On the other hand, another one of the ODD and EVEN output frame data, which is obtained by applying the later-described first or second gain to the ODD or EVEN input frame data, is referred to as "output frame image data".

The double speed circuit 411 thus produces the ODD and EVEN input frame data using first input frame image data of the multiple input frame image data continuously input thereto. Then, the gain circuit 412 applies the first gain to one of these ODD and EVEN input frame data and applies the third gain to another thereof to produce first output frame image data as the output frame image data and first low-tone frame image data as the low-tone frame image data.

Furthermore, the double speed circuit 411 produces the ODD and EVEN input frame data using second input frame image data of the multiple input frame image data continuously input thereto; the second input frame image data are input frame image data subsequent to the first input image data. Then, the gain circuit 412 applies the second gain to one of these ODD and EVEN input frame data and applies the third gain to another thereof to produce second output frame image data as the output frame image data and second low-tone frame image data as the low-tone frame image data.

The input frame image data subsequently continuously input to the double speed circuit 411 are also the first and second input frame image data. That is, the first and second input frame image data are alternately and repetitively input to the double speed circuit 411. As a result, the gain circuit 412 alternately and repetitively produces a set of the first output frame image data and the first low-tone frame image data and a set of the second output frame image data and the second low-tone frame image data.

The VTγ circuit 413 is configured to perform a γ(gamma)-correction on the ODD and EVEN output frame data from the gain circuit 412 (and on the first and second low-tone frame image data as needed) so as to provide a required optical characteristic according to a tone characteristic that changes depending on the liquid crystal response characteristic of the liquid crystal element 3.

The color unevenness correction circuit 414 is configured to perform, on the ODD and EVEN output frame data after the γ-correction from the VTγ circuit 413 (and on the first and second low-tone frame image data as needed), a color unevenness correction for correcting color unevenness generated in the projector's optical system including the liquid crystal element 3.

The PWM circuit (driver) 415 is configured to drive the liquid crystal element 3 by the above-described sub-frame drive method depending on the ODD and EVEN output frame data after the color unevenness correction from the color unevenness correction circuit 414 (and on the first and second low-tone frame image data as needed).

Next, description will be made of specific processes performed by the gain circuit 412 in a case of, for example, causing the adjacent pixels in the liquid crystal element 3 to display mutually adjacent and 49 tones. Pixel data at adjacent pixel positions corresponding to the above adjacent pixels in each of the ODD and EVEN input frame data input to the gain circuit 412 (that is, corresponding adjacent pixel positions in the ODD and EVEN input frame data) have the 48 and 49 tones. In the following description, the pixel data at the adjacent pixel positions in the ODD and EVEN input frame data and in the ODD and EVEN output frame data are referred to as "adjacent pixel data".

The gain circuit 412 applies mutually different gains to the respective ODD and EVEN input frame data from the double speed circuit 411 to produce the ODD and EVEN output frame data. FIG. 12A illustrates an example that the gain circuit 412 applies a gain of 1.0 (100%) as the first gain to the ODD input frame data to produce the ODD output frame data (1st). In this example, the gain circuit 412 applies a gain of 0.9 (90%) as the second gain to the EVEN input frame data to produce the EVEN output frame data (2nd). Thereby, the tones of the adjacent pixel data in the ODD output frame data (1st) are 48 and 49 tones. On the other hand, the tones of the adjacent pixel data in the EVEN output frame data (2nd) are 43 and 44 tones (rounded off to the closest whole number).

The gain circuit 412 sets a sum of the first and second gains applied to the ODD and EVEN input frame data produced repetitively by the double speed circuit 411 using the respective multiple input frame image data continuously input thereto to a fixed value (100%+90%=190%).

Figure 14A:
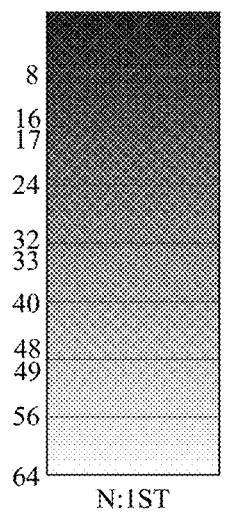
FIGS. 14A to 14C illustrate frame images sequentially displayed on the liquid crystal element in Embodiment 1.
Figure 14A:
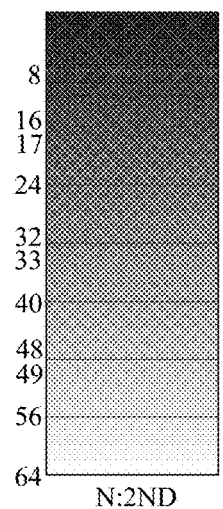
Figure 14A:
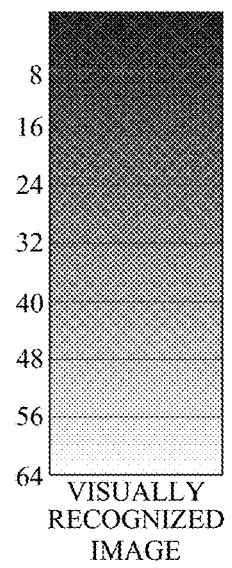

FIG. 14A illustrates displayed images (projected by the projector) when the liquid crystal element 3 is sequentially driven depending on ODD and EVEN output frame data produced without the mutually different gains being applied by the gain circuit 412. FIG. 14A illustrates a 1st frame that is an image displayed when the liquid crystal element 3 is driven depending on the ODD output frame data and a 2nd frame that is an image displayed when the liquid crystal element 3 is driven depending on the EVEN output frame data. N represents a frame number of the input frame image data. N:1st and N:2nd respectively represent the 1st frame and the 2nd frame respectively corresponding to the ODD output frame data and the EVEN output frame data produced from the input image data of an N frame. FIG. 14C illustrates a displayed image that should be originally displayed.

In FIG. 14A, the ODD and EVEN output frame data both have 0 to 64 tones between their upper and lower ends. A most right drawing in FIG. 14A illustrates an image visually recognized by an observer who observes the 1st and 2nd frames continuously. In this case of FIG. 14A, pixel data at each of all corresponding pixel positions in the ODD and EVEN output frame data have mutually identical tones. Therefore, the 1st frame and 2nd frames are mutually identical images. As a result, in both the 1st and 2nd frames, dark lines due to the disclination are generated at adjacent pixel positions of 16 and 17 tones, 32 and 33 tones, 48 and 49 tones and other adjacent tones.

The drawing strongly illustrates the dark lines for making them clearly visible, but in reality, since the liquid crystal element 3 is driven by the above-described first drive method, the dark lines are only slightly visible. However, the observer can visibly recognize these dark lines.

Figure 14B:
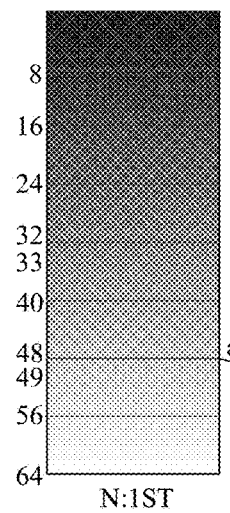
Figure 14B:
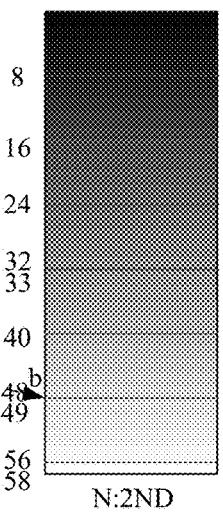
Figure 14B:
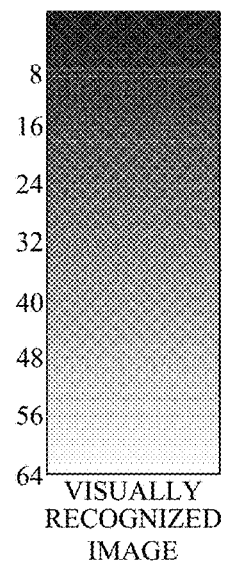
Figure 14C:
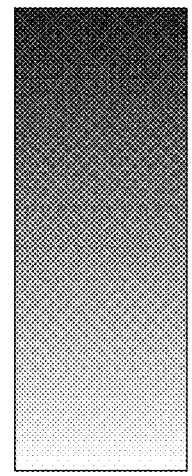

FIG. 14B illustrates a 1st frame and a 2nd frame that are images displayed when the liquid crystal element 3 is sequentially driven depending on the ODD and EVEN output frame data produced with the mutually different gains (100% and 90%) being applied by the gain circuit 412. The ODD output frame data has 0 to 64 tones corresponding to the gain of 100% between its upper and lower ends. On the other hand, the EVEN output frame data has 0 to 58 tones corresponding to the gain of 90% between its upper and lower ends.

Thereby, the dark lines due to the disclination in the 1st frame and the dark lines in the 2nd frame are located at mutually different positions (that is, are mutually shifted). For example, a position "a" of the dark line between 48 and 49 tones in the 1st frame and a position "b" of the dark line therebetween in the 2nd frame are mutually shifted.

As a result, in an image visually recognized by the observer, which is illustrated as a most right drawing in FIG. 14B, the 1st and 2nd frames are averaged and thereby the strength of each dark line reduces to about half of that of the original one. Accordingly, this embodiment enables making the dark lines more unnoticeable as compared with the case of driving the liquid crystal element 3 only by the first drive method.

FIGS. 15A and 15B illustrate specific examples of the displayed images. FIG. 15C illustrates a displayed image that should be originally displayed. FIG. 15A illustrates a 1st frame and a 2nd frame displayed when the liquid crystal element 3 is sequentially driven depending on the ODD and EVEN output frame data produced without mutually different gains being applied by the gain circuit 412. A most right drawing in FIG. 15A illustrates an image visually recognized by the observer. The 1st and 2nd frames include dark lines due to the disclination at mutually same positions, so that the dark lines are noticeable to some extent in the visually recognized image.

On the other hand, FIG. 15B illustrates a 1st frame and a 2nd frame displayed when the liquid crystal element 3 is sequentially driven depending on the ODD and EVEN output frame data produced with mutually different gains (100% and 90%) being applied by the gain circuit 412.

An outside lightest tone in the 1st frame is 64 tone, and on the other hand, that in the 2nd frame is 58 tone. The 1st and 2nd frames include dark lines due to the disclination at mutually different positions, so that, in a visually recognized image illustrated as a most left image in FIG. 15B in which the 1st and 2nd frames are averaged, the dark lines are approximately unnoticeable.

The second drive method just described produces the ODD and EVEN output frame data such that the pixel data at the corresponding pixel positions have mutually different tones and drives the liquid crystal element 3 depending on these ODD and EVEN output frame data, which causes the positions of the dark lines in the displayed 1st and 2nd frames to be mutually shifted and thereby enables making the dark lines in the visually recognized image unnoticeable.

The tones of the pixel data at the corresponding pixel positions in the ODD and EVEN output frame data are desirable to have therebetween a difference (tone difference) of 20% or less of a higher one of these tones. In other words, the first and second gains applied to the ODD and EVEN output frame data are desirable to have therebetween a difference (gain difference) of 20% or less of a higher one of these first and second gains. A larger difference between the tones or the first and second gains than the above-described 20% undesirably makes light and dark changes between the 1st and 2nd frames noticeable.

Furthermore, the difference of the tones is more desirable to be 1% or more of the higher one of these tones. In other words, the difference of the first and second gains is more desirable to be 1% or more of the higher one of these first and second gains. This is because a smaller difference between the tones or the first and second gains than the above-described 1% provides almost no shift of the dark lines between the 1st and 2nd frames and therefore cannot provide the effect to make the dark lines sufficiently unnoticeable.

Although the above embodiment described the case of producing, using the input frame image data input at 60 Hz, the two frame image data at the frequency corresponding to 120 Hz, four frame image data may be produced at a frequency corresponding to 240 Hz. In this case, two sets of ODD and EVEN input frame data are produced. Then, for example as illustrated in FIG. 12B, the gain circuit 412 applies a gain of 100% to the ODD input frame data of the first set to produce ODD output frame data (1st) and applies a gain of 90% to the EVEN input frame data thereof to produce EVEN output frame data (2nd). Furthermore, the gain circuit 412 applies the gain of 100% to the ODD input frame data of the second set to produce ODD output frame data (3rd) and applies the gain of 90% to the EVEN input frame data thereof to produce EVEN output frame data (4th). This process provides an equivalent effect to that illustrated in FIGS. 14B and 15B.

Moreover, when the first and second frame image data are produced at the frequency corresponding to 120 Hz, the second frame image data may be intermediate image data produced by interpolation or the like using two continuous first frame image data produced from two continuous input frame image data.

In this case, the second frame image data may include an area (such as an area including motion) not included in the first frame image data and thereby the first and second frame image data are mutually different image data. However, in such a case, when pixel data at corresponding pixel positions in still areas in the first and second frame image data have mutually identical tones, the second drive method can be applied to these still areas.

[Embodiment 2]

Next, description will be made of a second embodiment (Embodiment 2) of the present invention. In this embodiment, constituent elements identical to those in Embodiment 1 are denoted by the same reference numerals as those in Embodiment 1.

Embodiment 1 described the case of applying the gains of 100% and 90% respectively to the ODD and EVEN input frame data produced using all the multiple input frame image data continuously input. On the other hand, this embodiment will describe a case of changing gains applied to ODD and EVEN input frame data produced using respective multiple input frame image data (that is, at each frame).

Figure 13A:
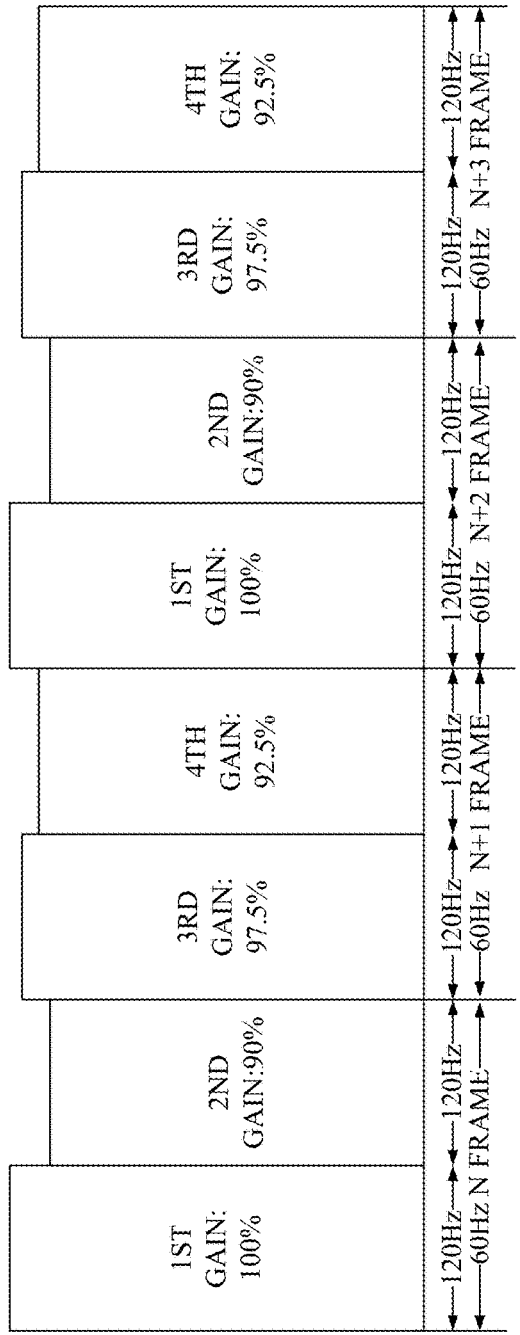
FIGS. 13A and 13B illustrate ODD and EVEN output frame data in Embodiment 2 of the present invention.

FIG. 13A illustrates an example of gains applied to ODD and EVEN input frame data by a gain circuit 412 when these ODD and EVEN input frame data are produced at a frequency corresponding to 120 Hz. In this example, the gain circuit 412 applies a gain of 100% (first gain) to ODD input frame data of an N frame to produce ODD output frame data (1st) and applies a gain of 90% (second gain) to EVEN input frame data of the N frame to produce EVEN output frame data (2nd). Thereby, when tones of adjacent pixel data in the ODD output frame data (1st) output from the gain circuit 412 are 48 and 49 tones, tones of adjacent pixel data in the EVEN output frame data (2nd) output from the gain circuit 412 are 43 and 44 tones (rounded off to the closest whole number). This applies to an N+2 frame.

Furthermore, the gain circuit 412 applies a gain of 97.5% (first gain) to ODD input frame data of an N+1 frame to produce ODD output frame data (1st) and applies a gain of 92.5% (second gain) to EVEN input frame data of the N+1 frame to produce EVEN output frame data (2nd). Thereby, tones of adjacent pixel data in the ODD output frame data (1st) output from the gain circuit 412 are 47 and 48 tones, and tones of adjacent pixel data in the EVEN output frame data (2nd) output from the gain circuit 412 are 44 and 45 tones (rounded off to the closest whole number). This applies to an N+3 frame.

Also in this embodiment, the gain circuit 412 sets a sum of the first and second gains applied to the ODD and EVEN input frame data produced repetitively by the double speed circuit 411 using the respective multiple input frame image data continuously input thereto to a fixed value.

That is, the gain circuit 412 sets the first and second gains as follows:

the sum of the first and second gains for each of the N and N+2 frames is 100%(1st)+90%(2nd)=190%; and the sum of the first and second gains for each of the N+1 and N+3 frames is 97.5%(1st)+92.5%(2nd)=190%.

FIG. 16A illustrates displayed images (projected by the projector) when a liquid crystal element 3 is sequentially driven depending on ODD and EVEN output frame data produced without the mutually different gains being applied by the gain circuit 412.

FIG. 16A illustrates a 1st frame that is an image displayed when the liquid crystal element 3 is driven depending on the ODD output frame data and a 2nd frame that is an image displayed when the liquid crystal element 3 is driven depending on the EVEN output frame data.

N represents a frame number of the input frame image data. N:1st and N:2nd respectively represent the 1st frame and the 2nd frame respectively corresponding to the ODD output frame data and the EVEN output frame data produced using the input image data of the N frame. FIG. 16C illustrates a displayed image that should be originally displayed.

In FIG. 16A, the ODD and EVEN output frame data both have 0 to 64 tones between their upper and lower ends. A most right drawing in FIG. 16A illustrates an image visually recognized by an observer who observes the 1st and 2nd frames continuously. In the case of FIG. 16A, pixel data at each of all corresponding pixel positions in the ODD and EVEN output frame data have mutually identical tones. Therefore, the 1st frame and 2nd frames are mutually identical images. As a result, in both the 1st and 2nd frames, dark lines due to the disclination are generated at adjacent pixel positions of 16 and 17 tones, 32 and 33 tones, 48 and 49 tones and other adjacent tones. The drawing strongly illustrates the dark lines for making them clearly visible, but in reality, since the liquid crystal element 3 is driven by the above-described first drive method, the dark lines are only slightly visible. However, the observer can visibly recognize these dark lines.

FIG. 16B illustrates a 1st frame and a 2nd frame that are images displayed when the liquid crystal element 3 is sequentially driven depending on the ODD and EVEN output frame data produced with the mutually different gains (100%, 90%, 97.5% and 92.5%) being applied by the gain circuit 412. In the N frame, the ODD output frame data has 0 to 64 tones corresponding to the gain of 100% between its upper and lower ends.

On the other hand, the EVEN output frame data has 0 to 58 tones corresponding to the gain of 90% between its upper and lower ends. Thereby, the dark lines due to the disclination in the 1st frame and the dark lines in the 2nd frame are located at mutually different positions (that is, are mutually shifted). For example, a position "a" of the dark line between 48 and 49 tones in the 1st frame and a position "b" of the dark line therebetween in the 2nd frame are mutually shifted.

Furthermore, in the N+1 frame, the ODD output frame data has 0 to 62 tones corresponding to the gain of 97.5% between its upper and lower ends. On the other hand, the EVEN output frame data has 0 to 59 tones corresponding to the gain of 92.5% between its upper and lower ends. Thereby, the dark lines due to the disclination in the 1st frame and the dark lines in the 2nd frame are located at mutually different positions (that is, are mutually shifted). For example, a position "c" of the dark line between 48 and 49 tones in the 1st frame and a position "d" of the dark line therebetween in the 2nd frame are mutually shifted. Moreover, these positions c and d are shifted from the above positions a and b. As a result, in an image visually recognized by the observer, which is illustrated as a most right drawing in FIG. 16B, the 1st and 2nd frames are averaged and thereby the strength of each dark line reduces to about quarter of that of the original one. Accordingly, this embodiment enables making the dark lines more unnoticeable as compared with the case of driving the liquid crystal element 3 only by the first drive method (and with Embodiment 1).

Figure 13B:
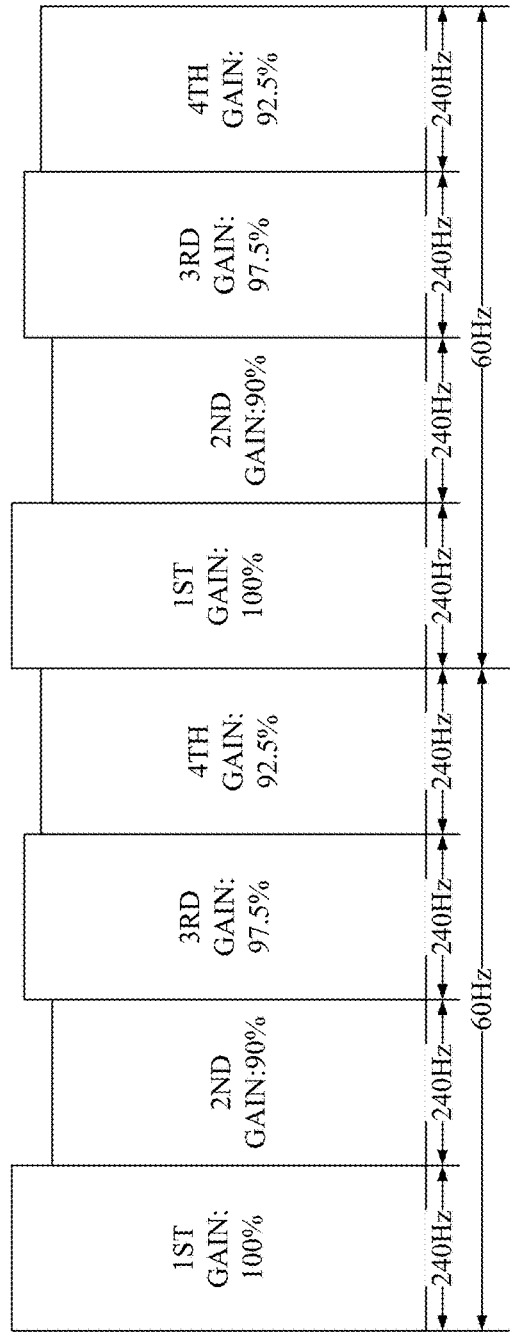

Although this embodiment described the case of producing the two frame image data at the frequency corresponding to 120 Hz, four frame image data may be produced at a frequency corresponding to 240 Hz. In this case, two sets of the ODD and EVEN input frame data are produced. Then, for example as illustrated in FIG. 13B, the gain circuit 412 applies a gain of 100% to the ODD input frame data of the first set to produce ODD output frame data (1st) and applies a gain of 90% to the EVEN input frame data thereof to produce EVEN output frame data (2nd). Furthermore, the gain circuit 412 applies a gain of 97.5% to the ODD input frame data of the second set to produce ODD output frame data (3rd) and applies a gain of 92.5% to the EVEN input frame data thereof to produce EVEN output frame data (4th). This process provides an equivalent effect to that illustrated in FIG. 16B.

Also in this embodiment, the tones of the pixel data at the corresponding pixel positions in the ODD and EVEN output frame data have therebetween a difference (tone difference) of 1% or more and 20% or less of a higher one of these tones.

Each of the above embodiments shifts, when driving the liquid crystal element depending on the respective first and second frame image data, positions on the liquid crystal element where the disclination is generated, which enables reducing image quality degradation due to the disclination.

[Embodiment 3]

Next, description will be made of a third embodiment (Embodiment 3) of the present invention. In this embodiment, constituent elements identical to those in Embodiment 1are denoted by the same reference numerals as those in Embodiment 1.

A gain circuit 412 illustrated in FIG. 11 is configured to apply a first gain to ODD input frame data produced using first input frame image data by a double speed circuit 411 illustrated in FIG. 11 to produce first output frame image data. Furthermore, the gain circuit 412 is configured to apply a second gain different from the first gain to ODD input frame data produced using second input frame image data by the double speed circuit 411 to produce second output frame image data. Pixel data at pixel positions corresponding to each other (in other words, corresponding pixels positions) in the first and second input frame image data have mutually identical tones.

FIG. 21A illustrates an example that the gain circuit 412 applies, in each of N and N+2 frames, a gain of 1.0 (100%) as the first gain to the ODD input frame data produced using the first input frame image data to produce the first output frame image data (1st).

Furthermore, in this example, the gain circuit 412 applies, in each of N+1 and N+3 frames, a gain of 0.9 (90%) as the second gain to the ODD input frame data produced using the second input frame image data to produce the second output frame image data (2nd). Thereby, tones of adjacent pixel data in the first output frame data (1st) output from the gain circuit 412 are 48 and 49 tones, and tones of adjacent pixel data in the second output frame data (2nd) output from the gain circuit 412 are 43 and 44 tones (rounded off to the closest whole number). Moreover, between the first output frame data (1st) and the second output frame data (2nd), entire black frame image data (3rd in FIG. 21A) are inserted.

Therefore, a liquid crystal element 3 is sequentially driven depending on the first output frame image data, the entire black frame image data (first low-tone frame image data), the second output frame image data and the entire black frame image data (second low-tone frame image data). That is, adjacent pixels of the liquid crystal element 3 displays in the N frame 48 and 49 tones and then 0 and 0 tones, displays in the N+1 frame 43 and 44 tones and then 0 and 0 tones and displays in subsequent frames these tones in the above order cyclically.

The gain circuit 412 repeats producing the first and second output frame image data using respective sets of the first and second input frame image data (that is, the ODD input frame data) repetitively input thereto such that a sum of the first and second gains applied to the first and second input frame image data of each set is a fixed value. The sum of the first and second gains in this embodiment is 100%+90%=190%.

FIG. 22A illustrates displayed images (projected by the projector) when the liquid crystal element 3 is sequentially driven depending on first and second output frame data produced without the mutually different gains being applied by the gain circuit 412.

FIG. 22A illustrates a 1st frame that is an image displayed when the liquid crystal element 3 is driven depending on the first output frame image data and a 2nd frame that is an image displayed when the liquid crystal element 3 is driven depending on the second output frame image data. In addition, FIG. 22A illustrates a 3rd frame that is an image displayed when the liquid crystal element 3 is driven depending on the entire black frame image data. FIG. 22C illustrates a displayed image that should be originally displayed.

In FIG. 22A, the first and second output frame image data both have 0 to 64 tones between their upper and lower ends. A most right drawing in FIG. 22A illustrates an image visually recognized by an observer who observes the 1st and 2nd frames (and the 3rd frames) continuously. In this case of FIG. 22A, pixel data at each of all corresponding pixel positions in the first and second output frame image data have mutually identical tones. Therefore, the 1st frame and 2nd frames are mutually identical images. As a result, in both the 1st and 2nd frames, dark lines due to the disclination are generated at adjacent pixel positions of 16 and 17 tones, 32 and 33 tones, 48 and 49 tones and other adjacent tones.

The drawing strongly illustrates the dark lines for making them clearly visible, but in reality, since the liquid crystal element 3 is driven by the above-described first drive method, since the liquid crystal element 3 is driven by the above-described first drive method, the dark lines are only slightly visible. However, the observer can visibly recognize these dark lines.

FIG. 22B illustrates a 1st frame and a 2nd frame that are images displayed when the liquid crystal element 3 is sequentially driven depending on the first and second output frame image data produced with the mutually different gains (100% and 90%) being applied to the ODD input frame data by the gain circuit 412 and illustrates a 3rd frame that is an image displayed when the liquid crystal element 3 is driven depending on the entire black frame image data. The first output frame image data has 0 to 64 tones corresponding to the gain of 100% between its upper and lower ends. On the other hand, the second output frame image data has 0 to 58 tones corresponding to the gain of 90% between its upper and lower ends. Thereby, the dark lines due to the disclination in the 1st frame and the dark lines in the 2nd frame are located at mutually different positions (that is, are mutually shifted). For example, a position "a" of one of the dark lines between 48 and 49 tones in the 1st frame and a position "b" of the dark line therebetween are mutually shifted. As a result, in an image visually recognized by the observer, which is illustrated as a most right drawing in FIG. 22B, the 1st and 2nd frames are averaged and thereby the strength of each dark line reduces to about half of that of the original one. Accordingly, this embodiment enables making the dark lines more unnoticeable as compared with the case of driving the liquid crystal element 3 only by the first drive method.

FIGS. 23A and 23B illustrate specific examples of the displayed images. FIG. 23c illustrates a displayed image that should be originally displayed.

FIG. 23A illustrates a 1st frame and a 2nd frame displayed when the liquid crystal element 3 is sequentially driven depending on the first and second output frame image data produced without mutually different gains being applied by the gain circuit 412. A most right drawing in FIG. 23A illustrates an image visually recognized by the observer. The 1st and 2nd frames include dark lines due to the disclination at mutually same positions, so that the dark lines are noticeable to some extent in the visually recognized image.

On the other hand, FIG. 23B illustrates a 1st frame and a 2nd frame displayed when the liquid crystal element 3 is sequentially driven depending on the first and second output frame image data produced with mutually different gains (100% and 90%) being applied by the gain circuit 412. An outside lightest tone in the 1st frame is 64 tone, and on the other hand, that in the 2nd frame is 58 tone. The 1st and 2nd frames include dark lines due to the disclination at mutually different positions, so that, in a visually recognized image illustrated as a most left image in FIG. 23B in which the 1st and 2nd frames are averaged, the dark lines are approximately unnoticeable.

The second drive method just described in this embodiment, despite the pixel data at the corresponding pixel positions in the first and second input frame image data have mutually identical tones, produces the first and second output frame image data such that the pixel data at the corresponding pixel positions therein have mutually different tones and drives the liquid crystal element 3 depending on these first and second output frame image data. That is, the second drive method causes the positions of the dark lines in the displayed 1st and 2nd frames to be mutually shifted and thereby enables making the dark lines in the visually recognized image unnoticeable.

Furthermore, the second drive method in this embodiment inserts the first and second low-tone frame image data (entire black frame image data) between the drives of the liquid crystal element 3 depending on the first and second output frame image data, which enables improving visibility of a displayed motion image.

When the second input frame image data includes an area including motion, the pixel data at the corresponding pixel positions in the first and second input frame image data do not always have mutually identical tones. However, in such a case, when pixel data at corresponding pixel positions in still areas in the first and second input frame image data have mutually identical tones, the second drive method can be applied to these still areas.

The tones of the pixel data at the corresponding pixel positions in the first and second output frame image data are desirable to have therebetween a difference (tone difference) of 20% or less of a higher one of these tones. In other words, the first and second gains applied to the first and second output frame image data are desirable to have therebetween a difference (gain difference) of 20% or less of a higher one of these first and second gains. A larger difference between the tones or the first and second gains than the above-described 20% undesirably makes light and dark changes between the 1st and 2nd frames noticeable. Furthermore, the difference of the tones is more desirable to be 1% or more of the higher one of these tones. In other words, the difference of the first and second gains is more desirable to be 1% or more of the higher one of these first and second gains.

This is because a smaller difference between the tones or the first and second gains than the above-described 1% provides almost no shift of the dark lines between the 1st and 2nd frames and therefore cannot provide the effect to make the dark lines sufficiently unnoticeable.

Although the above embodiment described the case of producing, using the input frame image data input at 60 Hz, the two frame image data at the frequency corresponding to 120 Hz, four frame image data may be produced at a frequency corresponding to 240 Hz. In this case, two sets of ODD and EVEN input frame data are produced. Then, for example as illustrated in FIG. 21B, the gain circuit 412 applies a gain of 100% and a gain of 90% respectively to the ODD input frame data of the first set and the ODD input frame data of the second set to produce first output frame image data (1st) and second output frame image data (2nd). In addition, the gain circuit 412 applies a gain of 0 respectively to the EVEN input frame data of the first set and the EVEN input frame data of the second set to produce low-tone (black) frame image data (3rd). This process provides an equivalent effect to that illustrated in FIGS. 22B and 23B.

Furthermore, the gains applied to the ODD input frame data of the first set and the ODD input frame data of the second set sequentially produced using the continuous input frame image data are not necessarily to be fixed gains. For example, a method may be employed that applies a gain of 100% and a gain of 90% respectively to the ODD input frame data of the first set and the ODD input frame data of the second set in the N frame and then applies a gain of 97.5% and a gain of 92.5% respectively to the ODD input frame data of the first set and the ODD input frame data of the second set in the N+1 frame. As a result, the four frames whose dark lines are mutually shifted are averaged and thereby the strength of each dark line reduces to about quarter of that of the original one, which enables making the dark lines more unnoticeable.

Also in this case, the gain circuit 412 repeats producing the first and second output frame image data using respective sets of the first and second input frame image data (that is, the ODD input frame data) repetitively input thereto such that a sum of the first and second gains applied to the first and second input frame image data of each set is a fixed value.

That is, the gain circuit 412 sets the first and second gains as follows:

the sum of the first and second gains for each of the N frame is 100%(1st)+90%(2nd)=190%; and the sum of the first and second gains for the N+1 frame is 97.5%(1st)+92.5%(2nd)=190%.

Although this embodiment described the case of performing the black insertion, the above-described light-and-dark drive also provides an equivalent effect to that of the black insertion.

When the light-and-dark drive is performed, the same gains as those for producing the first and second output frame image data when the black insertion is performed may be set. In addition, low tones of dark frames in the light-and-dark drive may be a fixed tone or may be changed at each frame.

Furthermore, this embodiment described the case of applying the first and second gains respectively to the first and second input frame image data to produce the first and second output frame image data.

However, a method may be employed that provides a first offset to the first input frame image data to produce the first output frame image data and provides a second offset to the second input frame image data to produce the second output frame image data. In this case, according to the same reason for setting the difference between the first and second gains to be 1% or more and 20% or less of a higher one of these first and second gains, a difference (offset difference) between the first and second offsets is desirable to be 1% or more and 20% or less of a maximum tone value settable in the first and second output frame image data. Moreover, as with the sum of the first and second gains, it is desirable to produce the first and second output frame image data using the first and second input frame image data repetitively input such that a sum of the first and second offsets is a fixed value.

This embodiment shifts, when driving the liquid crystal element depending on the respective first and second output frame image data, positions on the liquid crystal element where the disclination is generated, which enables reducing image quality degradation due to the disclination. Furthermore, this embodiment inserts the drive of the liquid crystal element depending on the first and second low-tone frame image data, which enables improving visibility of a displayed motion image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-176773, filed on Sep. 8, 2015 and No. 2015-176886, filed on Sep. 8, 2015, which are hereby incorporated by reference herein in their entirety.

What is claimed is:

1. A liquid crystal drive apparatus configured to drive a liquid crystal element, the apparatus comprising:

an image data producer configured to produce, using each of multiple input frame image data continuously input thereto, first frame image data and second frame image data; and a driver configured to drive the liquid crystal element so as to cause each of multiple pixels of the liquid crystal element to form a tone by sequentially controlling, depending on the first frame image data and the second frame image data, application of a first voltage or a second voltage lower than the first voltage to each of the multiple pixels of the liquid crystal element in each of multiple sub-frame periods that are included in one frame period and in which the liquid crystal element is driven depending on one of the first and second image data, wherein the image data producer is configured to (a) apply a first gain to all tones of the input frame image data to produce the first frame image data and (b) apply a second gain different from the first gain to the all tones of that input frame image data to produce the second frame image data, and wherein a difference between the first gain and the second gain is 20% or less of a higher one of the first and second gains.

2. A liquid crystal drive apparatus according to claim 1, wherein the difference between the first gain and the second gain is 1% or more of the higher one of the first and second gains.

3. A liquid crystal drive apparatus according to claim 1, wherein the image data producer is configured to produce, using the respective input frame image data continuously input thereto, the first and second frame image data such that a sum of the first and second gains applied to the respective input frame image data is fixed.

4. A liquid crystal drive apparatus according to claim 1, wherein, when the sub-frame period where the first voltage is applied to the pixel is referred to as an ON period, the sub-frame period where the second voltage is applied to the pixel is referred to as an OFF period, and the sub-frame period that corresponds to the ON period and the OFF period respectively for a first pixel and a second pixel of two mutually adjacent pixels in the multiple pixels is referred to as an ON/OFF adjacent period,
the image data producer is configured to provide the difference between the first and second gains such that, in a case where the ON/OFF adjacent period is generated for the first and second pixels when the liquid crystal element is driven depending on one of the first and second frame image data, the ON/OFF adjacent period is not generated for the first and second pixels when the liquid crystal element is driven depending on another one of the first and second frame image data.

5. A liquid crystal drive apparatus according to claim 1, wherein the image data producer is configured to provide the difference between the first and second gains such that in the liquid crystal element a pixel position at which disclination is generated when the liquid crystal element is driven depending on the first frame image data and that at which the disclination is generated when the liquid crystal element is driven depending on the second frame image data are mutually different.

6. An image display apparatus comprising:
a liquid crystal element; and
a liquid crystal drive apparatus configured to drive the liquid crystal element,
wherein the liquid crystal drive apparatus comprises:
an image data producer configured to produce, using each of multiple input frame image data continuously input thereto, first frame image data and second frame image data; and
a driver configured to drive the liquid crystal element so as to cause each of multiple pixels of the liquid crystal element to form a tone by sequentially controlling, depending on the first frame image data and the second frame image data, application of a first voltage or a second voltage lower than the first voltage to each of the multiple pixels of the liquid crystal element in each of multiple sub-frame periods that are included in one frame period and in which the liquid crystal element is driven depending on one of the first and second image data,
wherein the image data producer is configured to (a) apply a first gain to all tones of the input frame image data to produce the first frame image data and (b) apply a second gain different from the first gain to the all tones of that input frame image data to produce the second frame image data, and
wherein a difference between the first gain and the second gain is 20% or less of a higher one of the first and second gains.

7. A non-transitory computer-readable storage medium storing a liquid crystal drive program as a computer program to cause a computer to drive a liquid crystal element, the program causing the computer to:
produce, using each of multiple input frame image data continuously input to the computer, first frame image data and second frame image data; and
drive the liquid crystal element so as to cause each of multiple pixels of the liquid crystal element to form a tone by sequentially controlling, depending on the first frame image data and the second frame image data, application of a first voltage or a second voltage lower than the first voltage to each of the multiple pixels of the liquid crystal element in each of multiple sub-frame periods that are included in one frame period and in which the liquid crystal element is driven depending on one of the first and second image data,
wherein the program causes the computer to (a) apply a first gain to all tones of the input frame image data to produce the first frame image data and (b) apply a second gain different from the first gain to the all tones of that input frame image data to produce the second frame image data, and
wherein a difference between the first gain and the second gain is 20% or less of a higher one of the first and second gains.

8. A liquid crystal drive apparatus comprising:
an image data producer configured to (a) produce, using first input frame image data of multiple input frame image data continuously input thereto, first output frame image data and first low-tone output frame image data whose tone is lower than that of the first output frame image data and (b) produce, using second input frame image data of the multiple input frame image data, second output frame image data and second low-tone output frame image data whose tone is lower than that of the second output frame image data; and
a driver configured to drive the liquid crystal element so as to cause each of multiple pixels of the liquid crystal element to form a tone by sequentially controlling, depending on the first output frame image data, the first low-tone output frame image data, the second output frame image data and the second low-tone output frame image data, application of a first voltage or a second voltage lower than the first voltage to each of the multiple pixels of the liquid crystal element in each of multiple sub-frame periods that are included in one frame period and in which the liquid crystal element is driven depending on one of the first, first low-tone, second and second low-tone output frame image data,
wherein the image data producer is configured to (a) apply a first gain to all tones of the first input frame image data to produce the first output frame image data, (b) apply a first low gain lower than the first gain to the all tones of the first input frame image data to produce the first low-tone output frame image data, (c) apply a second gain different from the first gain to the all tones of the second input frame image data to produce the second output frame image data and (d) apply a second low gain lower than the second gain to the all tones of the second input frame image data to produce the second low-tone output frame image data, and wherein a difference between the first gain and the second gain is 20% or less of a higher one of the first and second gains.

9. A liquid crystal drive apparatus according to claim 8, wherein the difference between the first and second gains is 1% or more of the higher one of the first and second gains.

10. A liquid crystal drive apparatus according to claim 8, wherein the image data producer is configured to produce, using respective sets of the first and second input frame image data continuously input thereto, the first and second output frame image data such that a sum of the first and second gains applied to the first and second input frame image data of each set is fixed.

11. A liquid crystal drive apparatus according to claim 8, wherein, when the sub-frame period where the first voltage is applied to the pixel is referred to as an ON period, the sub-frame period where the second voltage is applied to the pixel is referred to as an OFF period, and the sub-frame period that corresponds to the ON period and the OFF period respectively for a first pixel and a second pixel of two mutually adjacent pixels in the multiple pixels is referred to as an ON/OFF adjacent period, the image data producer is configured to provide the difference between the first and second gains such that, in a case where the ON/OFF adjacent period is generated for the first and second pixels when the liquid crystal element is driven depending on one of the first and second output frame image data, the ON/OFF adjacent period is not generated for the first and second pixels when the liquid crystal element is driven depending on another one of the first and second output frame image data.

12. A liquid crystal drive apparatus according to claim 8, wherein the image data producer is configured to provide the differences between the first and second gains such that in the liquid crystal element a pixel position at which disclination is generated when the liquid crystal element is driven depending on the first output frame image data is different from that at which the disclination is generated when the liquid crystal element is driven depending on the second output frame image data.

13. A liquid crystal drive apparatus according to claim 8, wherein each of the first and second low-tone output frame image data causes all the pixels of the liquid crystal element to form mutually identical tones.

14. A liquid crystal drive apparatus according to claim 8,
wherein the image data producer is configured to apply a third gain to the first and second input frame image data to produce the first and second low-tone output frame image data; and
wherein the third gain is 50% or less of a higher one of the first and second gains.

15. An image display apparatus comprising:
a liquid crystal element; and
a liquid crystal drive apparatus configured to drive the liquid crystal element,
wherein the liquid crystal drive apparatus comprises:
an image data producer configured to (a) produce, using first input frame image data of multiple input frame image data continuously input thereto, first output frame image data and first low-tone output frame image data whose tone is lower than that of the first output frame image data and (b) produce, using second input frame image data of the multiple input frame image data, second output frame image data and second low-tone output frame image data whose tone is lower than that of the second output frame image data; and
a driver configured to drive the liquid crystal element so as to cause each of multiple pixels of the liquid crystal element to form a tone by sequentially controlling, depending on the first output frame image data, the first low-tone output frame image data, the second output frame image data and the second low-tone output frame image data, application of a first voltage or a second voltage lower than the first voltage to each of the multiple pixels of the liquid crystal element in each of multiple sub-frame periods that are included in one frame period and in which the liquid crystal element is driven depending on one of the first, first low-tone, second and second low-tone output frame image data,
wherein the image data producer is configured to (a) apply a first gain to all tones of the first input frame image data to produce the first output frame image data, (b) apply a first low gain lower than the first gain to the all tones of the first input frame image data to produce the first low-tone output frame image data, (c) apply a second gain different from the first gain to the all tones of the second input frame image data to produce the second output frame image data and (d) apply a second low gain lower than the second gain to the all tones of the second input frame image data to produce the second low-tone output frame image data, and
wherein a difference between the first gain and the second gain is 20% or less of a higher one of the first and second gains.

16. A non-transitory computer-readable storage medium storing a liquid crystal drive program as a computer program to cause a computer to drive a liquid crystal element, the program causing the computer to:
produce, using first input frame image data of multiple input frame image data continuously input thereto, first output frame image data and first low-tone output frame image data whose tone is lower than that of the first output frame image data;
produce, using second input frame image data of the multiple input frame image data, second output frame image data and second low-tone output frame image data whose tone is lower than that of the second output frame image data; and
drive the liquid crystal element so as to cause each of multiple pixels of the liquid crystal element to form a tone by sequentially controlling, depending on the first output frame image data, the first low-tone output frame image data, the second output frame image data and the second low-tone output frame image data, application of a first voltage or a second voltage lower than the first voltage to each of the multiple pixels of the liquid crystal element in each of multiple sub-frame periods that are included in one frame period and in which the liquid crystal element is driven depending on one of the first, first low-tone, second and second low-tone output frame image data,
wherein the program causes the computer to (a) apply a first gain to all tones of the first input frame image data to produce the first output frame image data, (b) apply a first low gain lower than the first gain to the all tones of the first input frame image data to produce the first low-tone output frame image data, (c) apply a second gain different from the first gain to the all tones of the second input frame image data to produce the second output frame image data and (d) apply a second low gain lower than the second gain to the all tones of the second input frame image data to produce the second low-tone output frame image data, and
wherein a difference between the first gain and the second gain is 20% or less of a higher one of the first and second gains.

* * * * *